(12) United States Patent
Gentry et al.

(10) Patent No.: US 6,888,803 B1
(45) Date of Patent: May 3, 2005

(54) SYSTEM, METHOD, AND COMPUTER PROGRAM PRODUCT FOR CONNECTIVITY OF WIRELESS BASE STATION TO PSTN VIA AN IP DATA NETWORK

(75) Inventors: William D. Gentry, Cary, NC (US); Samuel H. Christie, IV, Cary, NC (US); David P. Ress, Cary, NC (US); R. Emery Hanzel, Apex, NC (US); Kevin H. Klinge, Cary, NC (US); Richard M. Coyle, Durham, NC (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/280,152

(22) Filed: Mar. 26, 1999

Related U.S. Application Data

(63) Continuation-in-part of application No. 09/218,808, filed on Dec. 22, 1998.

(51) Int. Cl.$^7$ .......................... H04L 1/00; H04L 12/28; H04L 12/56; H04Q 11/00; H04J 3/16
(52) U.S. Cl. .................. 370/259; 370/401; 370/466
(58) Field of Search ............... 370/259, 310, 370/328, 329, 338, 352, 356, 400, 401, 464, 466; 455/422, 432

(56) References Cited

U.S. PATENT DOCUMENTS

| | | | | |
|---|---|---|---|---|
| 5,434,854 A | * | 7/1995 | Focarile et al. ............ 370/335 |
| 5,495,484 A | * | 2/1996 | Self et al. ................... 370/338 |
| 5,600,633 A | * | 2/1997 | Jaisingh et al. ............. 370/277 |
| 5,729,536 A | * | 3/1998 | Doshi et al. ................ 370/398 |
| 5,771,465 A | * | 6/1998 | Bojeryd ...................... 455/426 |
| 5,940,381 A | * | 8/1999 | Freeburg et al. ......... 370/310.1 |
| 5,953,339 A | * | 9/1999 | Baldwin et al. ............ 370/397 |
| 5,953,651 A | * | 9/1999 | Lu et al. ..................... 455/408 |
| 6,161,008 A | * | 12/2000 | Lee et al. ................... 370/352 |
| 6,389,011 B2 | * | 5/2002 | Allen et al. ................ 370/356 |

* cited by examiner

Primary Examiner—Frank Duong
Assistant Examiner—Kevin C. Harper
(74) Attorney, Agent, or Firm—Withrow & Terranova, PLLC

(57) ABSTRACT

A system for providing wireline telephone services to wireless subscribers utilizing a packet data network 100. The system includes a base station controller (BSC) 210 a base station controller gateway (BGW) 200 for providing client based services to mobile subscribers and providing protocol mapping between a mobile protocol and a packet data network protocol. The system further comprises a mobility gatekeeper (GK) 500 for managing network mobility services for each wireless call including the establishment of a call control path and a speech path between said base station controller and a serving end office telephone point. The system also comprises a end office gateway (EOGW) 300 for providing protocol conversion between the packet data network protocol and the end office point data protocol such that a wireless subscriber has access to all wireline services provided by the end office point. A mobile switching center (MSC) 410 and mobile switching center gateway (MGW) 400 are included to facilitate inter-system call handoffs into an existing circuit-switched wireless telephony network.

40 Claims, 11 Drawing Sheets

SYSTEM, METHOD, AND COMPUTER PROGRAM PRODUCT FOR CONNECTIVITY OF WIRELESS BASE STATION TO PSTN VIA AN IP DATA NETWORK

CROSS REFERENCE TO RELATED APPLICATION

This application is a continuation-in-part of and claims priority from copending U.S. patent application Ser. No. 09/218,808, filed Dec. 22, 1998, which bears the same title as this application, is assigned to the same assignee of this application, and is incorporated herein by reference.

TECHNICAL FIELD

The present invention to the creation of a new access configuration for mobile subscribers using an Internet Protocol (IP) interface, or other packet data network interface. More particularly, the present invention relates to the creation of a new access configuration for mobile subscribers using an IP interface, or other packet data network interface, in a way that is compatible with present telephone switching architecture, both public and private. The resulting configuration allows a wireless subscriber to simulate a wireline subscriber, and provides access to all provision-able wireline service features.

BACKGROUND AND RELATED ART

Currently, wireless subscriber profile data is configured in a home location register (HLR). The home location register resides either on an end office telephony switch (EOTS) or in an off-board node that supports IS-41 protocol signaling. The subscriber data profile is retrieved from the home location register upon registration and stored in a visitor location register (VLR) while the subscriber is active. In this scenario, the base station controller does not have knowledge of the subscriber's network service profile.

The present invention addresses several shortcomings of the current configuration. First, the present invention has the ability to provide services to a wireless subscriber from a single switching node, regardless of where the mobile is currently located in the network. The biggest challenge with providing business group functionality for a mobile subscriber is addressing how the service can be configured across multiple network nodes as the mobile moves from place to place. The present invention provides a mechanism to handle all services from a single switch point by providing a voice over IP (VoIP) connection between the mobile's serving base station controller and its home switch.

Second, the present invention has the ability to perform intra-network and inter-system handoffs without impacting the network switches that are involved in the call. Voice over IP (VoIP) provides a means to re-map call control and voice signaling without using physical trunking through the network. This also allows for multiple handoffs within a specific call without the need for additional physical trunking resources between the different switches serving the call. With the present invention, only the home switch and the base station controller currently serving the mobile are involved in the call.

Third, the present invention provides a mechanism which allows wireline services to be applied transparently to wireless subscribers. The VoIP interface between the base station controller and the serving end office switch permits wireless originations to be viewed as BRI originations which allows the BRI service suite to be applied to the call.

Other approaches using a T1 connection between the base station controller and the serving switch have been tried but do not provide the flexibility to reconfigure voice and call control signaling to the extent possible with voice over IP protocols such as H.323, H.225, H.245, SIP, and MGCP.

SUMMARY OF THE INVENTION

The present invention relates to the creation of a new access configuration for mobile subscribers using an IP interface. It provides a distributed mobile switching center configuration by distributing all mobility functions to an off-board node (such as a base station controller, gateway, or mobility gatekeeper), and providing an IP connection between the off-board node and a service switch. A data network, such as an IP or ATM network, is used to connect the off-board nodes with the serving switch. Voice-Over IP (such as outlined in H.323, SIP, MGCP, and other existing protocols) is used to establish the voice and call control channels. If desired, asynchronous transfer mode (ATM), or any other packet data network, may be utilized to transport the IP packet data between the base station controller and the serving switch.

As enhanced base station controller, which is a base station controller augmented to include gateway capabilities such as protocols mapping, functions as an endpoint for signaling to a IP network. The base station controller transmits and receives voice and call control information over an IP network between the serving switch and the radio equipment (mobile). Voice packets which are received from the serving switch over the IP network are relayed to a base transceiver system (BTS), where the information is subsequently transmitted to the mobiles. If an enhanced base station controller is used, a mobility gatekeeper will handle the IS-41 connectivity and provide the directory number to IP address mappings.

A base station controller gateway (BGW) is a new component which serves as the interface between an existing base station controller and the IP network. The base station controller gateway provides a client which is responsible for converting the call control signaling (e.g., IS-634 for CDMA) and voice channel signaling from the base station controller (BSC) to a protocol for use in the IP network (e.g., H.323). This allows for voice over IP (VoIP) connectivity between a serving switch and an existing base station controller (as opposed to using an enhanced base station controller). The base station controller gateway can provide connectivity to the IS-41 network, or this task could be delegated to the mobility gatekeeper. IS-41 is used to communicate with a home location register to retrieve subscriber profile data, as well as communicating with other mobile network nodes to perform mobility functions such as call delivery and handoff.

The mobility gatekeeper (GK) is responsible for establishing connections and providing a platform for network mobility services. It is used during all call originations and terminations from and to wireless subscribers served by either an enhanced base station controller or the base station controller gateway. The mobility gatekeeper also handles functionality such as registration, authentication, and address resolution, as well as providing a platform for network services and IS-41 communication.

Wireless subscriber data continues to be configured at a home location register. This includes existing services as well as information on subscribed business group services. Upon registration, information about mobility services (such as authentication, short message services, call delivery, etc.)

is communicated from the home location register to the mobility gatekeeper. In addition, the serving switch (base on the network identifier specified by the subscriber) contains a call processing profile with the mobile's directory number. The IP address of the serving switch is stored in the mobility gatekeeper and can be included in the registration acknowledgment to the serving base station controller or base station controller gateway. The subscriber can request to be registered in a private network, public network, or both, using either separate directory number or other aliases. If registration occurs to a private network, then the home location register sends a message to the mobile's home switch in order to establish a subscriber profile and obtain an IP routing address to be used on call originations. The IP address of the home switch is included in the registration acknowledgment message sent to the serving base station controller or base station controller gateway.

Once a roaming mobile has been registered to a private network, its home switch will be used for all call processing and service control, regardless of where, in the network, the subscriber is located at any given time. This gives the ability to provide integrated business services between wireline and wireless subscribers, regardless of the current location of the wireless subscribers in the network.

Roaming mobiles also have the option of registering on a public network. The interactions with the home location register are the same as described above, except the call processing profile is defined on the switch which is closest to the mobile's current location, instead of the mobile's home switch.

Hand-off for mobiles can be performed completely within the mobility gatekeeper and the enhanced base station controller/base station controller gateway without any intervention of the switch serving the mobile subscriber. The enhanced base station controller/base station controller gateway receives a message from the radio when handoff should be performed. The enhanced base station controller/base station controller gateway signals the handoff request to the mobility gatekeeper, which in turn signals either the receiving enhanced base station controller/base station controller gateway, or the gatekeeper which manages the receiving enhanced base station controller/base station controller gateway. A protocol such as IS-41 is used to relay information about the radio connection between the two (2) base station controllers, and call control signaling protocols, such as H.225 and H.245, are used to identify the IP address and port to which the signaling and voice channels should be mapped. When the handoff is performed, the mobility gatekeeper re-maps the call control and voice channels to the receiving enhanced base station controller/base station controller gateway. If multiple handoffs are performed during a single call, the VoIP solution eliminates the "shoe-stringing" of trunk connections between the switches involved in the call which occurs using today's handoff technology.

It is possible to support hand-off between two enhanced base station controller/base station controller gateways which are managed by different gatekeepers. This would occur if the enhanced base station controller/base station controller gateways are on separate inter-connected data networks. In this scenario, one gatekeeper forwards call control signaling to the other gatekeeper.

It is also possible to support inter-system handoff both with a VoIP compatible system, as well as an existing non-VoIP system. A mobile switching center gateway (MGW) is used as the interface between the data network and the legacy network whenever an inter-system handoff is performed to a non-VoIP system.

It is therefore an object of the invention to provide an enhanced base station controller which can serve as an endpoint for voice over IP in a data network environment.

It is a further object of the invention to provide a base station controller gateway which provides a client mapping between the mobility A-interface protocol (such as IS-634 for CDMA) and a VoIP protocol such as H.323 SIP, or MGCP. The base station controller gateway can also provide an access into the data network for wireless data applications.

It is a still further object of the invention to utilize voice over IP as the communication between the base station controller and the serving switch. This allows a roaming mobile to be served by their home switch and utilize their provisioned features from anywhere in the network.

It is yet another object of the invention to provide the ability to support intra-network handoffs using VoIP without needing any network trunking interfaces.

It is a still further object of the invention to provide new data services for the mobile subscriber which are enabled by having IP connectivity from the base station controller.

Some of the objects of the invention having been stated hereinabove, other objects will become evident as the description proceeds, when taken in connection with the accompanying drawings as best described hereinbelow.

DETAILED DESCRIPTION

Figure 1:
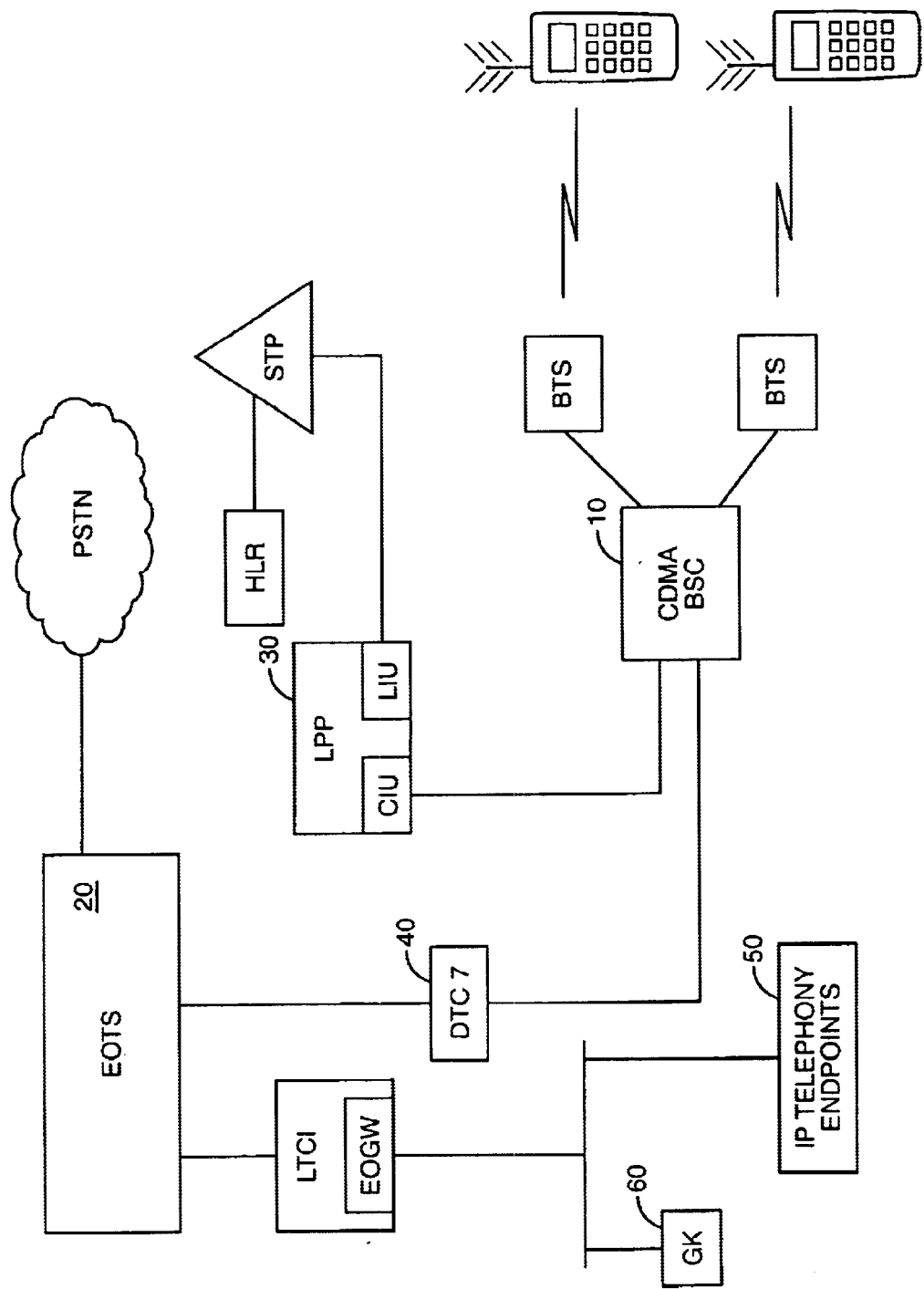
FIG. 1 illustrates a prior art hardware system architecture for the connection between a base station controller and a telephony network via an end office mobile telephony switch.

FIG. 1 illustrates a prior art hardware configuration for a typical wireless base station controller and its connectivity to a serving mobile telephony switch. In this example a CDMA base station controller 10 is connected to an end office telephony switch 20. Two separate sets of links are used to connect base station controller 10 to end office telephony switch 20. Call control signaling is routed through one set of links from the base station controller to the CDMA Interface Unit (CIU) in the link peripheral processor (LPP) 30. Call control signaling could be performed using a standardized protocol such as IS-634 or any one of a number of alternate signaling protocols. A second set of links 40 is used for voice channels between the base station controller and the switch. The voice channels are typically configured using G.711 vocoding over a channelized T1. Similar configurations exist for other PCS radio technologies, including TDMA, GSM, and their variants.

FIG. 1 also illustrates a platform for IP telephony endpoints 50 to access end office telephony switch 20. In this example, an H.323 data network is used to connect IP telephony endpoints 50 to an H.323 gatekeepers 60 as well as the integrated end-office gateway (EOGW). The end office gateway is responsible for transforming the call control signaling to the BRI protocol used on the switch (e.g., H.225 protocol mapped to Q.931). This platform permits IP telephony endpoints 30 on the data network to access all BRI services which are provided by the end office telephony switch 20.

The present invention continues to configure wireless subscriber profile data in a home location register (HLR). This includes existing services as well as information on subscribed business group services. Additionally, a basic rate interface (BRI) subscriber profile is established at the end office telephony switch to provide access into the PSTN. Upon registration of an individual mobile, information pertaining to mobility services (e.g., authentication, SMS, call delivery, etc.) is communicated to a base station controller gateway. The basic rate interface subscriber profile index (typically an E.164 directory number) is maintained in the home location register, which then communicates it to the enhanced base station controller/base station controller gateway for use with call originations. When a subscriber initiates a call, the subscriber uses the basic rate interface subscriber profile index to gain access into the PSTN through the end office telephony switch. With voice over IP (VoIP), the home switch handles call originations regardless of where the mobile is currently located.

With this capability, the present invention provides the ability for wireless subscribers to simulate a wireline basic rate interface. The present invention also has the ability to provide business group services from a central switching point. All mobility functions, including inter-system and intra-network handoffs, are accomplished in an IP network. The original switch provides all of the subscriber services eliminating the need for communicating service information among many network nodes.

Figure 2:
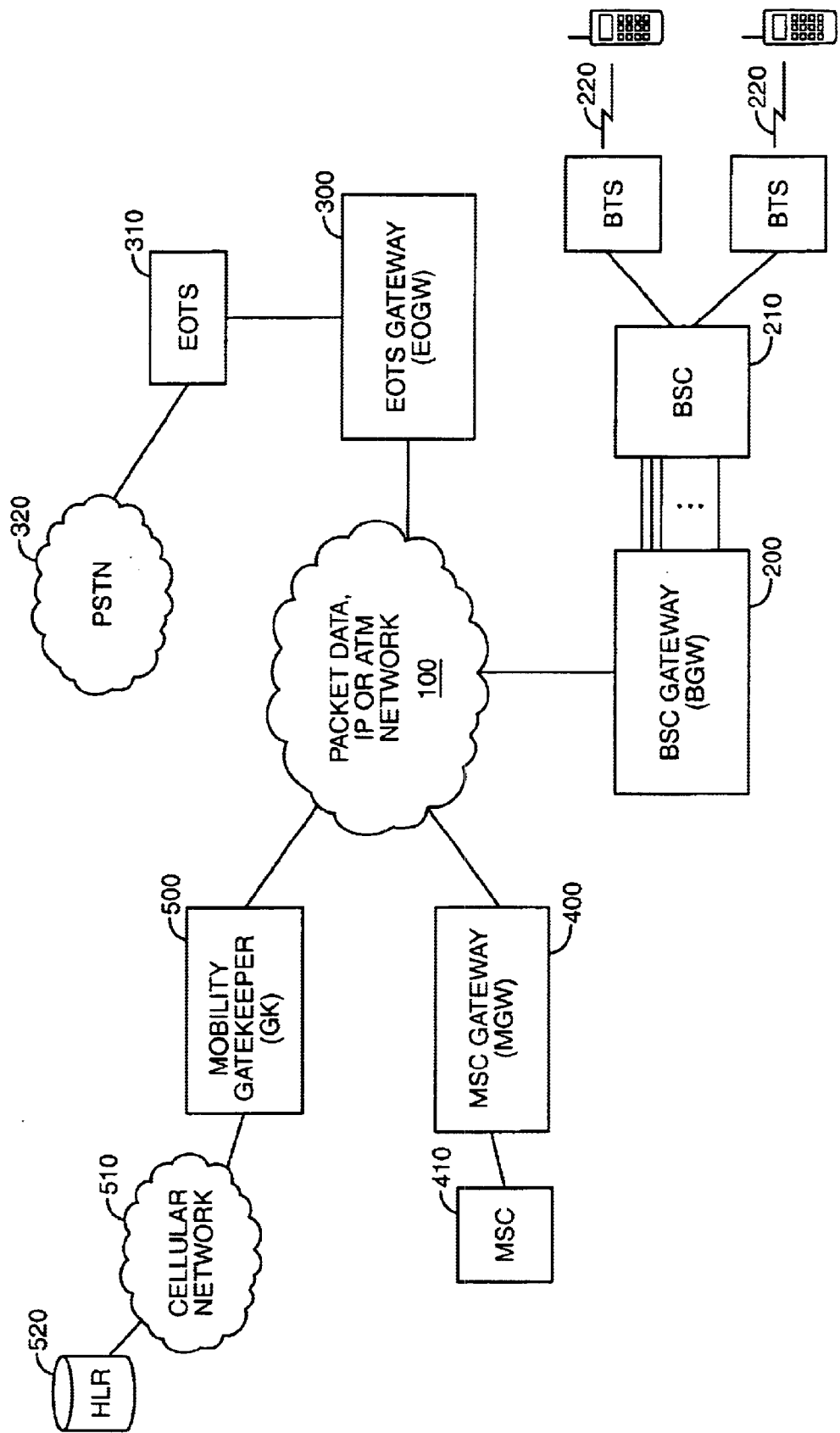
FIG. 2 illustrates one hardware system architecture for the present invention.

FIG. 2 illustrates one hardware configuration for the present invention. There are three gateway nodes and a gatekeeper node linked together via a data network 100. An IP network, an ATM network or other packet data networks may be used to transport the IP information, however, for purposes of illustration an IP network will be discussed throughout this description. Each of the gateway nodes is connected to various other hardware components which comprise the system of the present invention. Each of the hardware nodes is now described in further detail. Note that the terms of "subscriber", "radio", and "mobile" are used interchangeably throughout the specification and claims. Further, the term origination refers to the ability to place a call on a given network while the term termination refers to the ability to receive a call on a given network.

Base station controller gateway (BGW) 200 is a node that serves as the gateway between an existing base station controller (BCS) 210 and IP network 100. Base station controller gateway 200 provides T1 voice and call control ports to the base station controller 210 as well as IP ports to IP network 100. Base station controller gateway 200 is responsible for providing clients that support interworking between the A-interface signaling protocols (e.g., IS-634 for CDMA) from base station controller 210 and the IP network protocol (e.g., H.323, H.225, H.245, SIP, MGCP) 100. Base station controller gateway 200 communicates with a mobility gatekeeper (GK) 500 for zone management purposes including, but not limited to, authentication, registration mobility services, and handoffs. Base station controller gateway 200 is also responsible for implementing speech vocoding algorithms (e.g., G.711, G.723, G.729, et al.) into IP network 100 and potentially maintains visitor location register (VLR) information for mobiles 220 serves by base station controller 210. Lastly, base station controller gateway 200 establishes media channels between base station controller 210 and IP network 100 using protocols such as H.245.

End office gateway (EOGW) 300 is a node that serves as the gateway component between an end office telephony switch (EOTS) 310 and IP network 100. End office gateway 300 provides T1 voice and call control ports to a line trunk controller interface (LTCI) within end office telephony switch 310 as well as providing IP ports to IP network 100. End office gateway 300 (using H.323 for example), is responsible for receiving call control and speech packet messages from IP network 100 and translating the messages into Q.931 call control signaling messages. On mobile terminations, Q.931 termination messages are delivered to mobility gatekeeper 500 for mobile call delivery purposes. Lastly, the end office gateway 300 establishes media channels through the IP network 100 between the line trunk controller interface within end office telephony switch 310 and the gateway which is currently serving the mobile, such as a base station controller gateway. Protocols such as H.245 are used to establish the media channel.

Mobile switching center gateway (MGW) 400 is a node that serves as the gateway component between a mobile switching center (MSC) 410, such as a legacy CDMA, GSM, or TDMA mobile switching center, and the IP network 100. Mobile switching center gateway 400 provides T1 voice trunks to mobile switching center 410 as well as providing IP ports to IP network 100. Mobile switching center gateway 400 supports inter-system handoffs between a base station controller 210 served as IP network 100 and a base station controller which is not on the data network, such as a base station controller associated with a legacy mobile switching center 410 in the public switching telephone network (PSTN) 320. Mobile switching center gateway 400 also establishes trunk connections to mobile switching center 410 for speech connectivity whenever an interaction is required.

Mobility gatekeeper (GK) 500 is a node that is the component responsible for establishing connections between two (2) IP network call endpoints, as well as providing a platform for network mobility services. Mobility gatekeeper 500 provides an IS-41 interface via an IS-41cellular network 510 to home location register 520 in order to retrieve mobile subscriber data. Mobility gatekeeper 500 supports all network based mobility functions and services, including call delivery, handoff registration, and IS-41 messaging. On call origination, mobility gatekeeper 500 receives a setup message from the originating base station controller gateway 200 and routes the message to the end office gateway 300 providing service to the subscriber.

On termination, mobility gatekeeper 500 receives termination setup messages and interfaces with the IS-41 network 510 to determine the location of the serving base station controller 210. Mobility gatekeeper 500 routes the H.323 termination setup messages through IP network 100 to the serving base station controller 210, or to a mobility gatekeeper on an inter-connected data network that contains the serving enhanced base station controller/base station controller gateway. Lastly, mobility gatekeeper 500 provides the interface to home location register 520 for registration updates that are received from base station controller 210 and base station controller gateway 200 as mobiles activate, de-activate, and roam throughout the network.

The mobility gatekeeper maintains three (3) data tables. Table 1 is the Mobile Identification Number (MIN) to Home Mobile Switching Center (MSC) Mapping. Table 1 is provisioned at setup and identifies the home location register (HLR) point code and home end office gateway IP address (if applicable) for a range of mobile identification numbers.

TABLE 1

| From MIN | To MIN | HLR Point Code | Home EOGW IP Address |
|---|---|---|---|
| 9199910000 | 9199919999 | 207-42-7 | 47.202.17.4 |

Table 2 is the Base Station Controller Gateway Activation Status table. Table 2 is also provisioned at setup and has an entry for every base station controller gateway in the network (identified by IP address). Further, each base station controller gateway served by the mobility gatekeeper has an entry in this table which specifies the IP address for the default end office serving switch and the activation status of the base station controller gateway.

TABLE 2

| BGW IP Address | Default Public EOGW IP Address | Activation Status of BGW |
|---|---|---|
| 47.202.32.15 | 47.202.17.8 | Active |

Table 3 is the Visitor Location Table for Zone Management. Table 3 is provisioned as each individual mobile registers. It identifies the IP address of the base station controller gateway which serves the mobile, and the IP address of the end office gateway used for call originations. When a mobile registers specifying a public network, then the end office gateway IP address is retrieved from Table 2. On the other hand, if the mobile registers specifying a private network, then the end office gateway IP address is retrieved as the home end office gateway IP address from Table 1. Table 3 is keyed by the subsriber's mobile identification number (MIN).

TABLE 3

| MIN | BGW IP Address | EOGW IP Address |
|---|---|---|
| 9199911234 | 47.202.32.15 | 47.202.17.4 |

FIGS. 3 through 9, and 11 illustrate message sequences communicated among the previously described hardware nodes via IP network 100 for achieving various functional goals of the present invention. It is to be understood that communication of each of the messages illustrate herein is readily implementable by those of ordinary skill in the art as a computer program product having a medium with a computer program embodied thereon. The computer program product is capable of being loaded and executed on the appropriate computer processing device(s) in order to carry out the method or process steps described.

Figure 3:
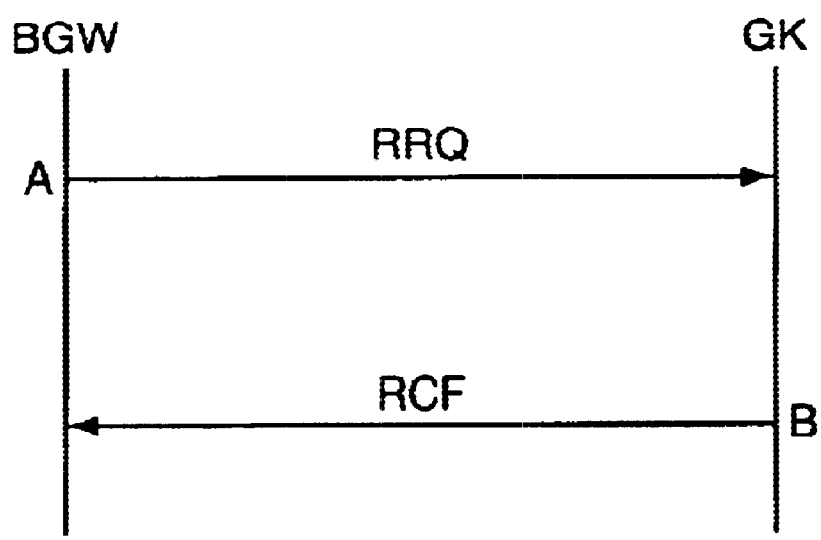
FIG. 3 illustrates the messaging sequence among the hardware nodes for initialization of the enhanced base station controller/base station controller gateway.

FIG. 3 illustrates the base station controller gateway initialization process. The base station controller gateway sends A a registration request message (RRQ) to it's mobility gatekeeper (GK). The registration request message contains the internet protocol (IP) address of the base station controller gateway. The mobility gatekeeper marks the base station controller gateway as active in the base station controller gateway activation status table (Table 2). A registration confirmed (RCF) message is then returned B from the mobility gatekeeper to the base station controller gateway. FIG. 3 shows messages from the H.225 protocol, although comparable messages from other voice over IP call control protocols could be substituted.

Figure 4:
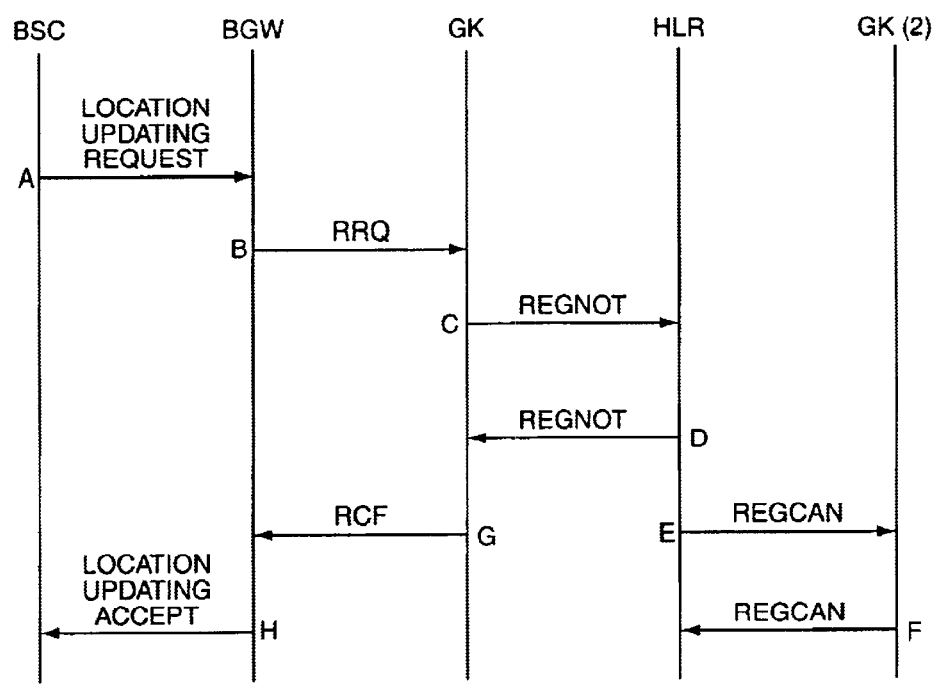
FIG. 4 illustrates the messaging sequence among the hardware nodes for registration of an individual mobile.

FIG. 4 illustrates registration of an individual mobile. To register an individual mobile, the first step is to send A a location updating request message from the base station controller to the base station controller gateway. The particular protocol of the location updating request depends on the radio technology (e.g., IS-634 for CDMA). The request will indicate whether the mobile desires to register on a public or private network. Next, a registration request message (RRQ) is sent B to the mobility gatekeeper as a part of zone management registration. The mobility gatekeeper uses Table 1 to map the subscriber's mobile identification number to the point code to which to route the IS-41 registration notification request message (REGNOT) to the subscriber's home location register. An IS-41 REGNOT message is constructed and send C to the home location register. The serving base station controller gateway is uniquely identified by the REGNOT through either the mobile switching center ID or comparable field. A regnot reply message is send D from the home location register to the mobility gatekeeper which includes the subscriber's service profile. The service profile contains information pertaining to the subscriber's level of service and includes such features as call forwarding, voice mail, caller ID, and the like. If the home location register determines that the mobile was active on a different mobile switching center, which would be the case if it were active on a different base station controller gateway, then it sends E a REGCAN IS-41 message to the previous serving mobile switching center ID which maps to the point code of its associated mobility gatekeeper. A regcan ack message is then sent F from the associated mobility gatekeeper back to the home location register. Next, a registration confirmed message (RCF) is sent G from the mobility gatekeeper to the base station controller gateway. The mobility gatekeeper updates Table 3 with the IP address of the base station controller gateway and serving end office gateway. The base station controller gateway makes note of the IP Address of its mobility gatekeeper as well as the IP address of its serving end office gateway. Lastly, the base station controller gateway returns H a location updating accept IS-634 message to complete the individual mobile registration process.

Figure 5:
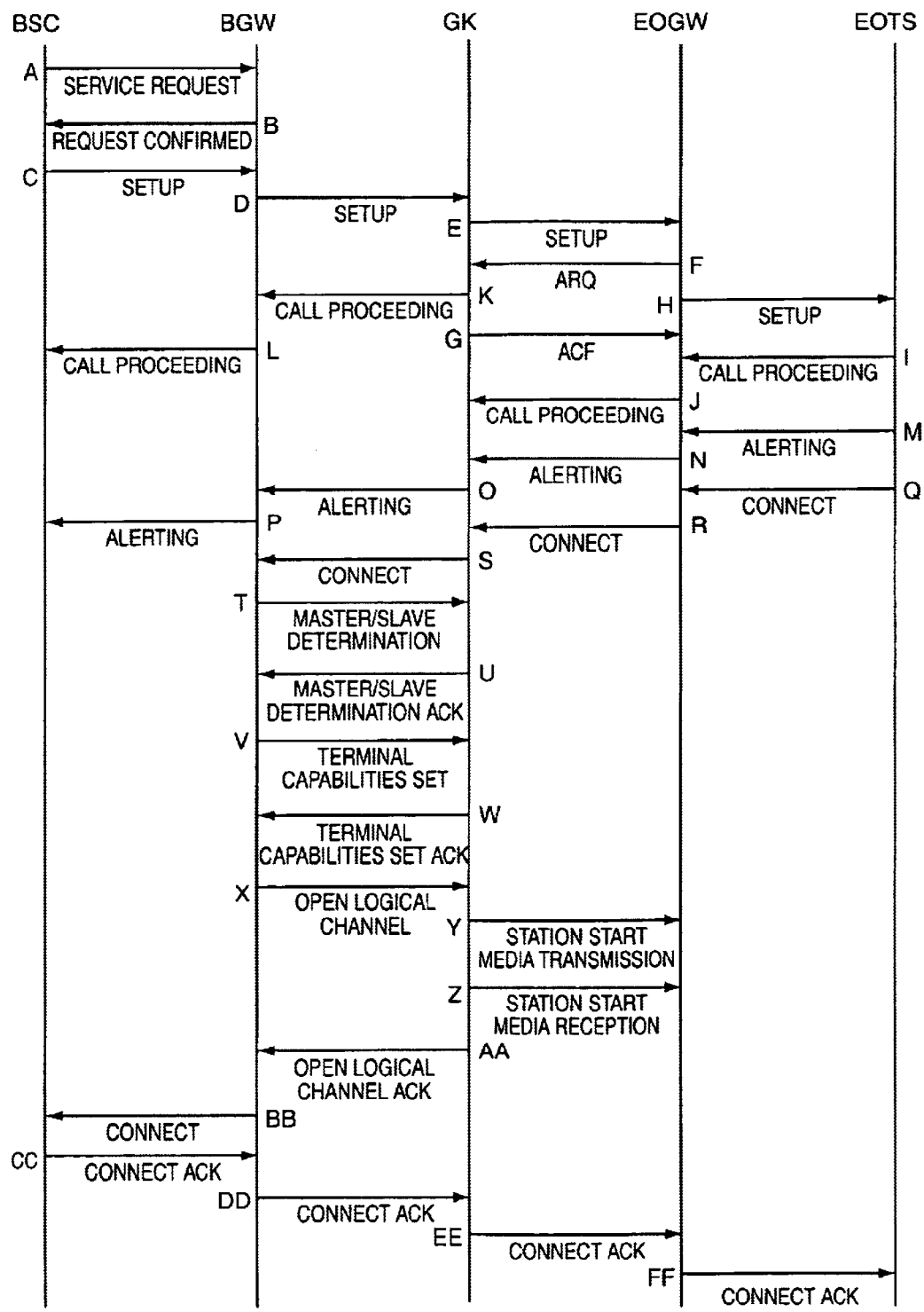
FIG. 5 illustrates the messaging sequence among the hardware nodes for call origination from a mobile.

FIG. 5 illustrates call origination from a mobile on the network. Call origination from a mobile on the network begins with the base station controller sending A a service request message to the base station controller gateway. The base station controller gateway responds B with a request confirmed message. It is understood that steps A and B are optional depending on the implementation of the system. The base station controller then sends C a setup message to the base station controller gateway using IS-634 or comparable A-interface protocol. The base station controller gateway converts the setup message to the VoIP call control protocol (such as H.225) and sends D it to the gatekeeper. The mobility gatekeeper, in turn, forwards E the setup message to the end office gateway. The end office gateway returns F an authorization request message (ARQ) to the mobility gatekeeper verifying the setup, using H.225 or a comparable protocol. The mobility gatekeeper responds G with an authorization confirmed message (ACF) back to the end office gateway.

Next, the end office gateway forwards H a Q.931 setup message to the end office telephony switch. The end office telephony switch processes this message as an ISDN basic rate interface origination. The end office telephony switch can provide direct access to the PSTN, or it can optionally be a private branch exchange (PBX) node which utilizes another switch to access the network. In either case, the end office telephony switch proceeds with translating and routing the call to the terminating agent per existing end office functionality. An optional setup acknowledgment message may be send in the reverse direction through each of the nodes. The end office telephony switch returns I a call proceeding message to the end office gateway which tandems J the call proceeding message to the mobility gatekeeper. The mobility gatekeeper then forwards K the call proceeding message to the base station controller gateway. Step K can be performed before the call proceeding message is received from the other endpoint. Either way, upon completion of step K, the base station controller gateway sends L a call proceeding message to the base station controller using IS-634 or comparable A-interface protocol. Steps M, N, O, and P track an alerting message from the end office telephony switch all the way to the base station controller. Steps Q, R, and S follow a connect message from the end office telephony switch to the base station controller gateway. Upon receiving the connect message, steps T, U, V, and W represent a message exchange among the base station controller gateway, end office gateway, and the mobility gatekeeper in order to establish the media channels for speech. H.245 or a comparable protocol can be used for the purpose of establishing the media channels for speech.

Following the initial media control channel message exchange, the base station controller gateway instructs X the mobility gatekeeper to open a logical media channel. Steps Y and Z show the mobility gatekeeper instructing the end office gateway to start media transmission and reception respectively. As soon as the media channels to the other end point have been established, the mobility gatekeeper sends AA an open logical channel acknowledgment message back to the base station controller gateway. Subsequently, a connect message is sent BB from the base station controller to the base station controller using IS-634 or comparable protocol gateway. Lastly, an optional connect acknowledgment message is sent through each node CC, DD, EE, and FF starting with the base station controller and ending with the end office telephony switch.

Figure 6:
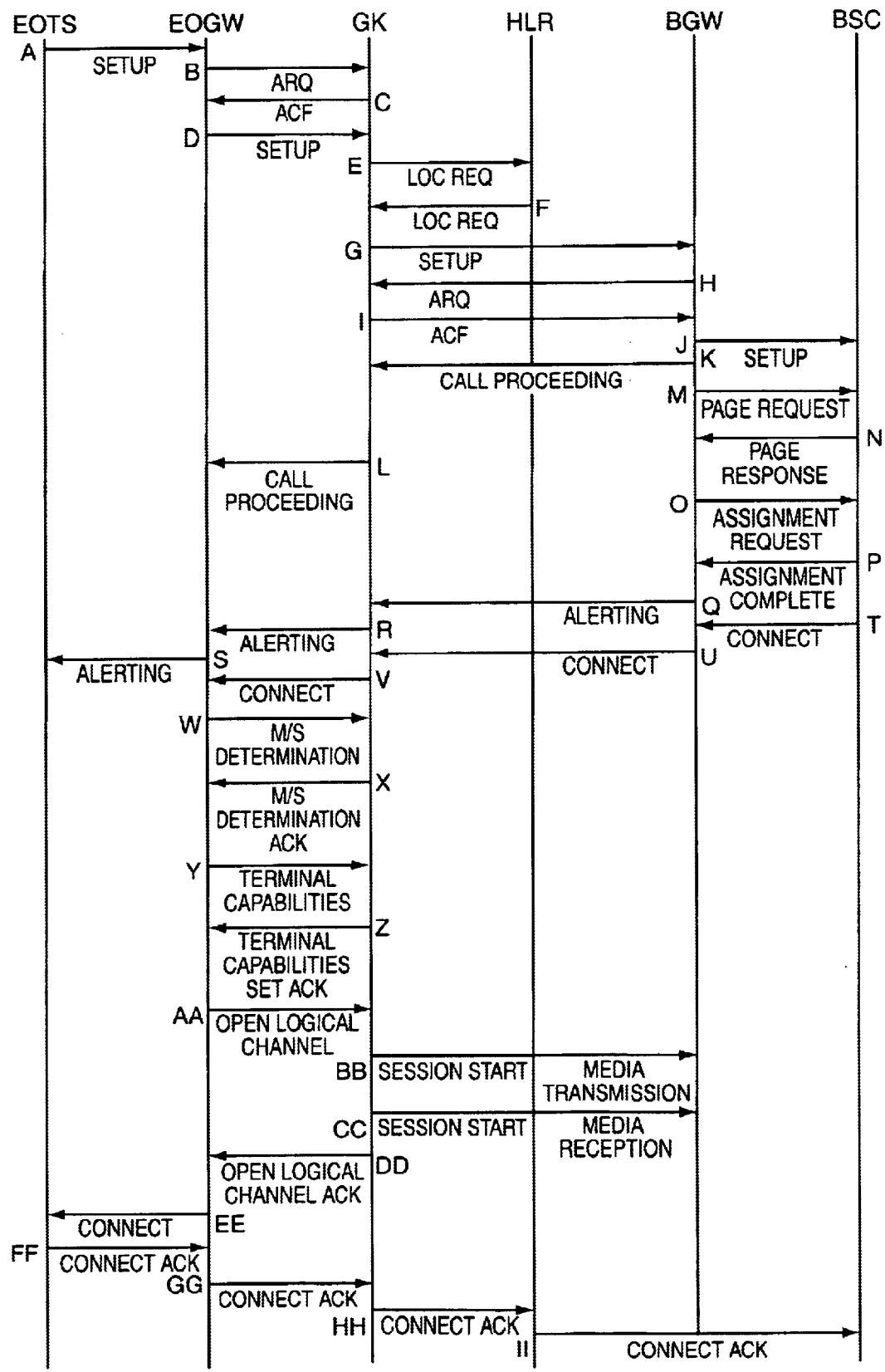
FIG. 6 illustrates the messaging sequence among the hardware nodes for call termination from a network to a mobile.

FIG. 6 illustrates mobile call termination from the network. Mobile call termination from the network begins with a Q.931 setup message A from the end office telephony switch node to the end office gateway node. An authorization request message (ARQ) is then sent B from the end office gateway to the mobility gatekeeper. The mobility gatekeeper responds C with an authorization confirm message (ACF) back to the end office gateway. H.225 or a comparable protocol can be used for this optional message exchange. End office gateway then sends D a setup message to the mobility gatekeeper using H.225 or a comparable protocol. Upon detecting that this is a mobile termination, the mobility gatekeeper sends E an IS-41 location request message (LOCREQ) to the home location register. The home location register responds F with a locreq response message which contains the mobile switching center ID that is translated into a base station controller gateway IP address where the mobile is currently active. A setup message is then send G from the mobility gatekeeper to the terminating base station controller gateway. The base station controller gateway uses H.225 or a comparable protocol to request authorization for the termination by sending H an (ARQ) message to the mobility gatekeeper. The mobility gatekeeper replies I with an authorization confirmation message (ACF) back to the base station controller gateway. A setup message is sent J from the base station controller gateway to the base station controller using IS-634 or comparable A-interface protocol. Steps K and L track a call proceeding message from the base station controller gateway through the mobility gatekeeper to the end office gateway. Messages Q, R, and S may optionally occur at this point if it is desirable to apply audible ringing to the originator while the terminating mobile is being paged.

Next, a page request message is sent M from the base station controller gateway to the base station controller which responds N by sending a page response message back to the base station controller gateway. An assignment request message is then sent O from the base station controller gateway to the base station controller followed by an assignment complete message P back to the base station controller gateway. If messages Q, R, and S have not already occurred as described above, then an alerting message is sent from base station controller gateway to the end office telephony switch via the mobility gatekeeper and the end office gateway. Steps T, U, and V represent a connect message going from the base station controller through the base station controller gateway and the mobility gatekeeper ending at the end office gateway. Upon receiving the connect message, steps W, X, Y, and Z represent a message exchange among the base station controller gateway, end office gateway, and the mobility gatekeeper in order to establish the media channels for speech. H.245 or a comparable protocol can be used for the purpose of establishing the media channels for speech. Following the initial media control channel message exchange, the base station controller gateway instructs AA the mobility gatekeeper to open a logical media channel. Steps BB and CC show the mobility gatekeeper instructing the end office gateway to start media transmission and reception respectively. As soon as the media channels to the other endpoint have been established, the mobility gatekeeper sends DD an open logical channel acknowledgment message back to the base station controller gateway. Subsequently, a connect message is sent EE from the base station controller to the base station controller using IS-634 or comparable protocol gateway. Lastly, an optional connect acknowledgment message is sent through each node FF, GG, HH, and II starting with the base station controller and ending with the end office telephony switch.

Throughout the termination process, if for any reason the mobile cannot be located or paged, a release message is returned to the end office telephony switch with a cause value indicating that the mobile is not available. This could occur if the mobile has moved into an area without radio coverage, or if idle RF resources are not available to establish the call. If this occurs, the end office telephony switch will react to the cause value by providing an appropriate treatment (such as a tone or announcement) to the calling party.

The message flow in FIG. 6 would be altered in the event that the mobile is currently receiving service from a base station controller which is not on the packet data network and a call delivery must be performed. In this scenario, steps A, B, C, D, and E are performed the same as described in FIG. 6 above. If the subscriber's profile in the home location register indicates that the subscriber is receiving service from a base station controller which is not served on the packet data network, then a call delivery must be performed.

Call delivery begins when the home location register sends an IS-41 routing request (ROUTEREQ) message to the address indicated in the subscriber profile as to where the mobile is currently receiving service. This address could correspond to a wireless end office switch node, such as a gateway, on a different packet data network. When the serving node receives the routing request message, it allocates a directory number which can be used to deliver the call through the public switching telephone network (PSTN) to the serving switch, and returns the directory number to the home location register in the routing request return message. The home location register then includes the directory number in the location request return message which is sent to the control node on the data network.

When the control node receives a location request return result with a call delivery routing number, it formulates a re-direction message using the packet data network call control protocol, includes the call delivery routing number, and sends it to the end office gateway that initiated the termination request. The end office gateway maps this message to a re-direction activation message using a Q.931 protocol extension, which instructs the end office switch to forward the call to the call delivery routing number.

As the call is being established, all services which the end office telephony switch provides for the access protocol are also applicable to the wireless subscriber that is accessing the switch via the data network. In this example, all basic rate interface (BRI) services would be available to the wireless subscriber since basic rate interface is the protocol used to access the end office telephony switch from the end office gateway. One such service (Call Forward Do Not Answer) can be illustrated by appending the following messages to FIG. 6. In this case, the Call Forward Do Not Answer service is executing on the end office telephony switch for the wireless termination. If the call forward do not answer timer expires while the wireless subscriber is receiving alerting messages, then the end office telephony switch proceeds with releasing the connection to the wireless terminal and forwarding the call as indicated by the call forward do not answer service. This is but one of many end office BRI services that can be provided to the wireless subscriber using this platform.

In addition, just as services can be provided by the end office telephony switch, they can also be provided by the gatekeeper. Service logic in the gatekeeper can be configured to create, break, or re-direct connections to mobile subscribers, as well as notify the end office telephony switch to perform actions through the public switching telepnone network (PSTN). For example, the Call Forward Do Not Answer service described above can optionally be implemented on the gatekeeper instead of the end office telephony switch. When the call forward do not answer timer expires in the gatekeeper, the gatekeeper can formulate a re-direction message using the packet data network call control protocol which includes the directory number to which the call should be re-directed, and send the message to the end office gateway, which in turn relays it to the end office telephony switch. Upon receiving this message, the end office telephony switch proceeds to release the connection to the wireless terminal and forward the call as directed in the message. Again, this is but one of many gatekeeper services that can be provided to the wireless subscriber using this platform.

Figure 7:
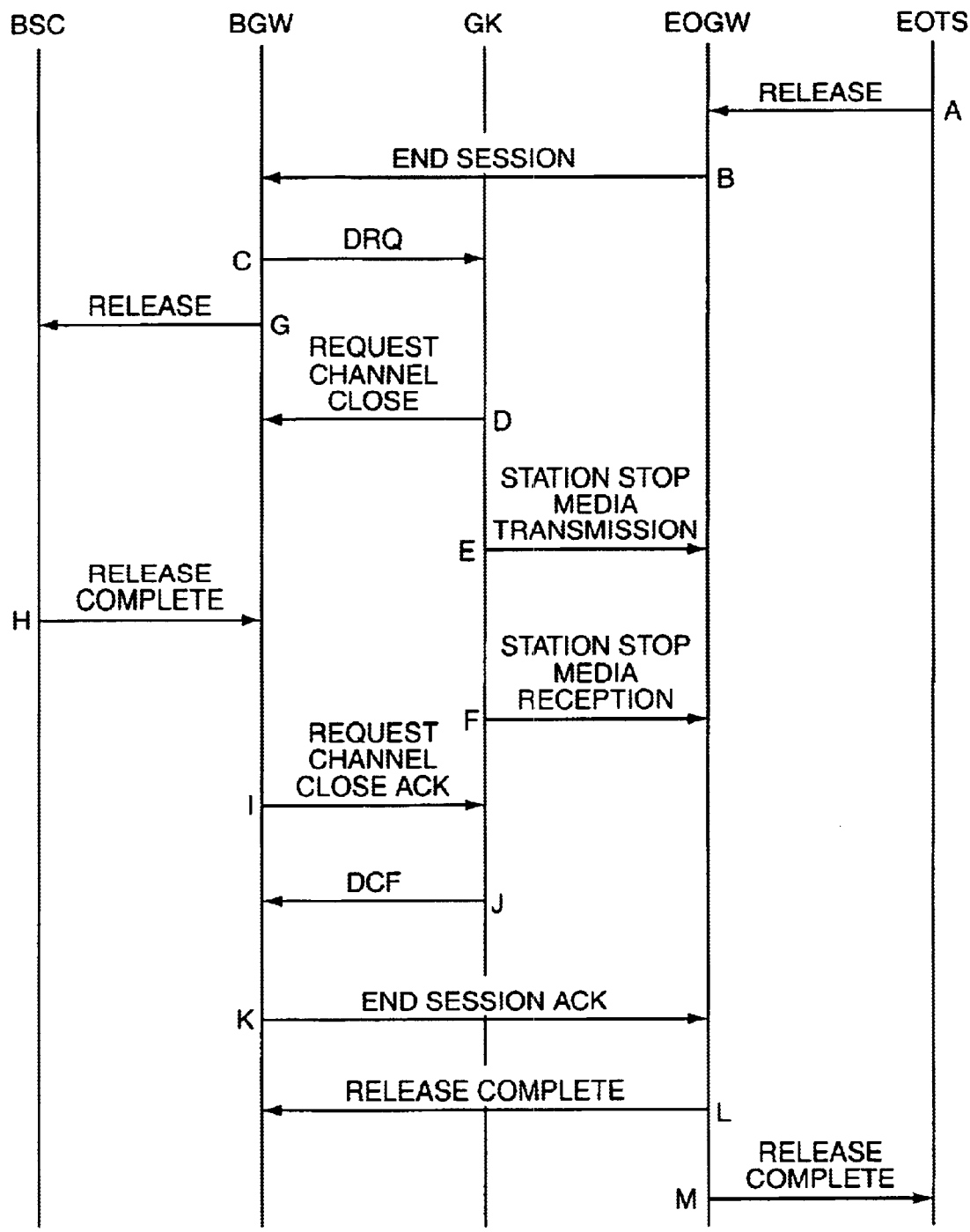
FIG. 7 illustrates the messaging sequence among the hardware nodes for call release from a network to a mobile.

FIG. 7 illustrates releasing a call from the network to the mobile. To release a call from the network to a mobile, the end office telephony switch sends A a Q.931 release message to the end office gateway node. The end office gateway sends B an end session message to the other endpoint, the base station controller gateway. The base station controller gateway responds C with a disengage request message (DRQ) to the mobility gatekeeper. The mobility gatekeeper sends D a request channel close message to the base station controller gateway followed by and station stop media transmission E and station stop media reception F messages to the end office gateway. The base station controller gateway sends G a release message to the base station controller. The base station controller returns H a release complete message to the base station controller gateway which then acknowledges I the request channel close message. The mobility gatekeeper confirms J the disengage request message (DRQ) from step C. An end session acknowledgment message is returned K to the end office gateway in response to step B. Lastly, the end office gateway optionally sends (L, M), depending upon the implementation, a release complete acknowledgment message to both the mobility gatekeeper and the end office telephony switch.

Figure 8:
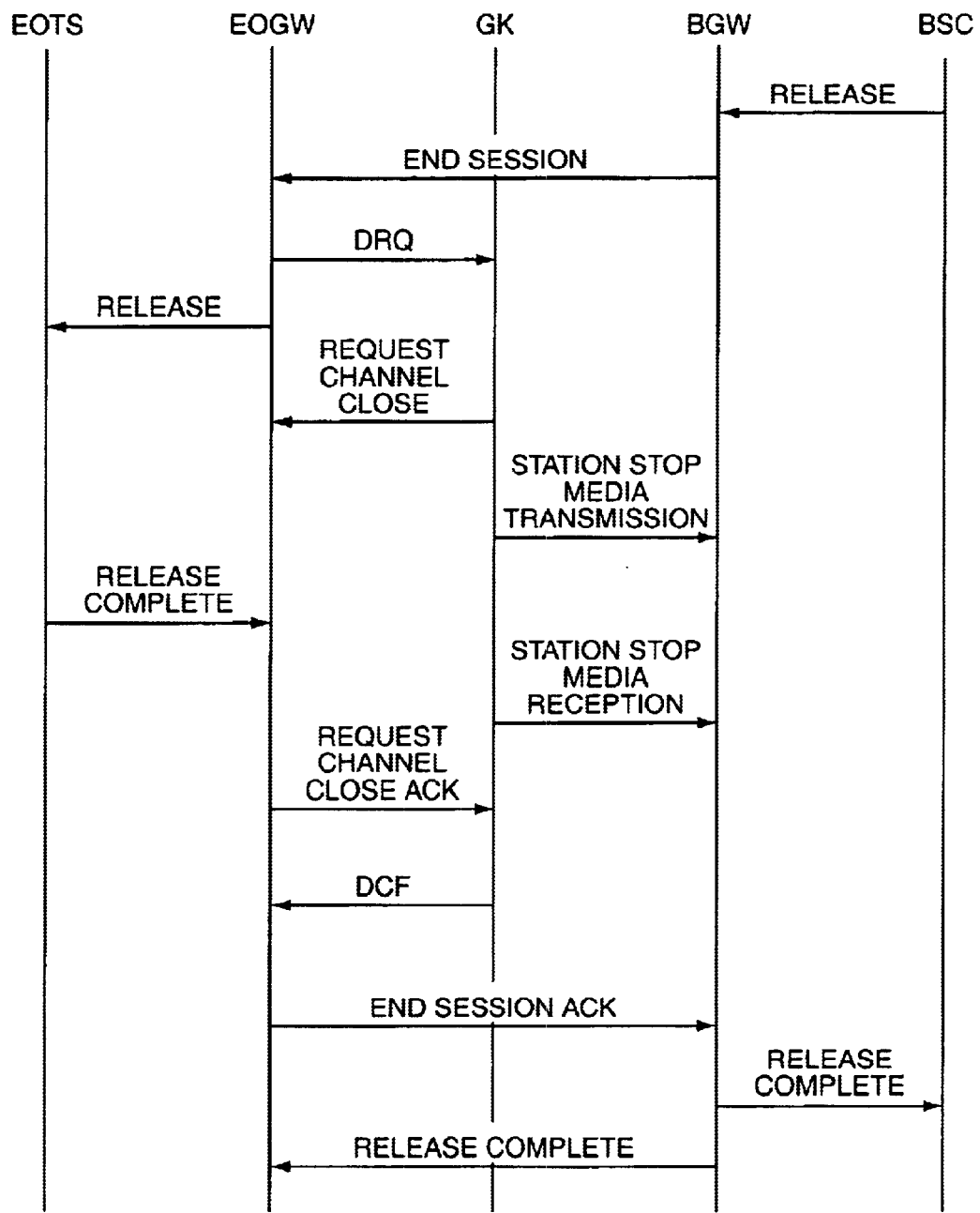
FIG. 8 illustrates the messaging sequence among the hardware nodes for call release from a mobile to a network.

FIG. 8 illustrates the message pattern for releasing a call from the mobile to the network. The pattern is very similar to that of releasing a call from the network to the mobile in that the messages have the same intent, just from a reverse direction .

Figure 9:
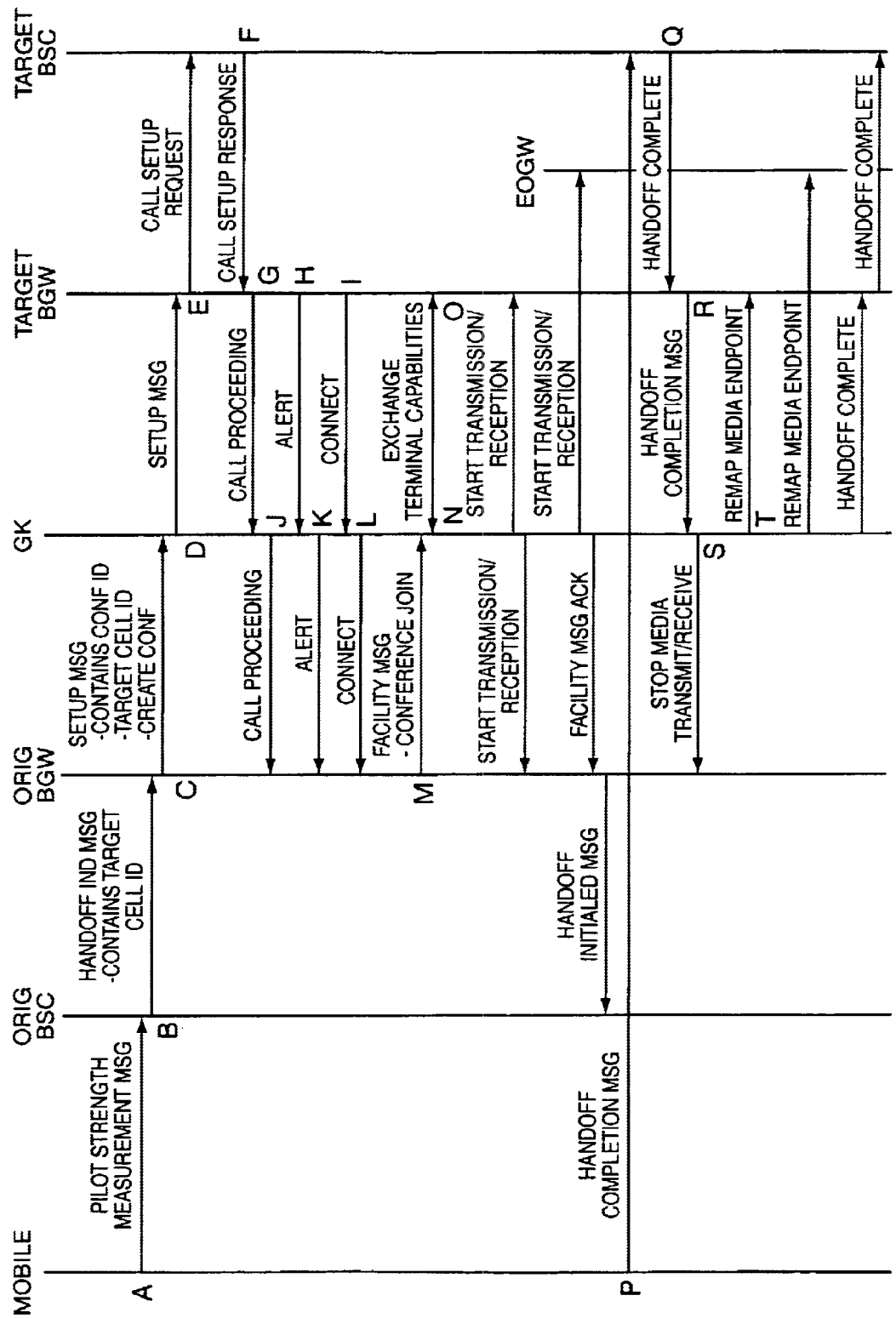
FIG. 9 illustrates the messaging sequence among the hardware nodes for performing an intra-network handoff.

FIG. 9 illustrates the messaging which can be used to perform an intra-network handoff for a wireless subscriber. An intra-network handoff refers to the handoff of an active call between two base station controllers which are connected to the data network. An intra-network handoff is required whenever a wireless subscriber is involved in a call while moving from the coverage area of one base station controller into the coverage area of a different base station controller. The mobility gatekeeper plays a coordinating role in establishing the handoff between two base station controller gateways on the data network. The call conferencing capabilities provided by the mobility gatekeeper are used to insure a new speech path is established with the target base station controller gateway before the speech patch with the original base station controller gateway is broken.

An intra-network handoffs is initiated by the radio when it sends a pilot strength measurement message A to the base station controller. The base station controller responds by sending an inter-system handoff indication message B to the base station controller gateway. This message contains a unique identifier for the target cell. The base station controller gateway then instructs the mobility gatekeeper to begin the handoff process by sending a conference setup message C to the mobility gatekeeper which includes a new call reference value, a conference identifier, a create_ conference directive, and the target cell identifier for the handoff.

The mobility gatekeeper examines the target cell identifier and determines that this is an intra-network handoff as opposed to an inter-system handoff. The mobility gatekeeper responds by relaying the setup message D to the target base station controller gateway. The message sent to the target base station controller gateway includes the target cell identifier which is used to instruct the target base station controller to establish a radio call control link with the mobile. The target base station controller gateway sends a call setup request message E to the base station controller which instructs it to begin transmitting to the mobile. As soon as the call setup is complete, the base station controller sends a call setup response message F to the base station controller gateway, which in turn responds with the call proceeding G, alerting H, and connect I messages to the mobility gatekeeper which completes the establishment of the call. The call proceeding and alerting messages (J,K) can optionally be tandemed to the original enhanced base station controller/base station controller gateway.

Upon receiving the connect message from the target base station controller gateway, the mobility gatekeeper forwards a connect message to the original base station controller gateway which informs it that the conference leg to the receiving base station controller gateway has been established. If the original base station controller gateway still intends to proceed with the handoff, it responds with a facility message M containing the conference_join directive. Upon receiving this message, the mobility gatekeeper initiates the call control signaling N needed to form a conference between itself, the original base station controller gateway, and the target base station controller gateway. The gatekeeper instructs each of the endpoints to begin transmitting and receiving on a media channel O which links it to conferencing facilities provided by the gatekeeper. The protocol used to establish the media channels in the conference can be H.245 or a comparable protocol. Upon completing this, a conference is in place, with all speech being transmitted simultaneously through the conferencing ports of the mobility gatekeeper between the end office gateway and both base station controller gateways.

The call will remain in a conferenced state until the radio indicates that would like to complete the handoff which, depending on the air interface could be an indefinite period of time. When this occurs, the mobile sends a handoff_completion message P to the target base station controller. The target base station controller, in turn, sends a handoff_completion_indication message Q to the target base station controller gateway, using IS-634 or a comparable protocol. The target base station controller gateway relays the handoff_completion message R to the mobility gatekeeper, which responds by releasing S the conference facilities to the initial base station controller gateway, and remapping T the media channel so that it directly maps the end office gateway to the target base station controller gateway, and releases the conference facilities which the call is using in the mobility gatekeeper. H.245 or a comparable protocol can be used to remap the media channels involved in the resulting connection.

An intra-network handoff can also occur if the original enhanced base station controller/base station controller gateway and the target enhanced base station controller/base station controller gateway are managed by separate nodes in inter-connected data networks. In this scenario, the gatekeeper which manages the original enhanced base station controller/base station controller gateway identifies the target gatekeeper based on the cell identification received in the setup message. It tandems the message to the target gatekeeper, which proceeds with a termination to the target enhanced base station controller/base station controller gateway. Conferencing facilities on the original gatekeeper are used throughout the duration of the handoff.

This approach can be expanded if it's desirable to establish the handoff without interrupting the speech path. In order to accomplish this, all calls which are set up between the base station controller gateway and the end office gateway must be done through conference resources in the gatekeeper. A conference ID is assigned to each call when setup occurs. In this configuration, the connect messages causes the media channels to be mapped through the gatekeeper conferencing facilities instead of directly between the endpoints.

Following this, if the base station controller gateway signals that a handoff is to occur, it sends a setup message to the mobility gatekeeper which includes the original conference identification number and the conference_invite directive. The mobility gatekeeper proceeds with signaling the target base station controller gateway as described above. However, in this case, since a conference_join message is not required, the conferencing component of the gatekeeper will automatically join all of the media channels when the connect message is received, causing speech to continue to all parties involved.

An alternative approach for intra-network handoff which can be taken is to utilize the simulcasting capabilities of the end office gateway. In this case, it is not necessary to establish a conference between the three parties. Instead, the mobility gatekeeper messages the target base station controller gateway to prepare it for the handoff, and then messages the end office gateway instructing it to establish a media channel with the target base station controller gateway, and simulcast all speech packets to both base station controller gateway media channels at the same time. This can be accomplished using multi-casting extensions to H.245 or a comparable protocol. When the target base station controller gateway signals that the handoff should be completed, the mobility gatekeeper instructs the end office gateway to cease transmitting and receiving on the media channel to the original base station controller gateway, and begin receiving on the media channel from the target base station controller gateway. This approach is preferred to the previous approach as long as the end office gateway has simulcasting capabilities. This approach eliminates the need to use the conferencing capabilities of the gatekeeper, and significantly reduces the amount of messaging involved with performing the handoff.

Subsequent intra-network handoffs can be performed using the same technique as described above. By using the techniques provided by this invention, it is possible to eliminate the use of trunking resources between base station controllers and serving switches for each subsequent handoff. No more resources are used in the IP network following the intra-network handoff than were used before the handoff was initiated.

When a call is finally released following an intra-network handoff, the same procedures are followed as are described in FIGS. 7 or 8, depending on whether the mobile or the network released the call. No additional signaling is required as a result of the fact that an intra-network handoff has occurred.

Inter-system handoff refers to the scenario where a subscriber is in an active call through a base station controller gateway, and travels into an area which is covered by a base station controller which is not on the data network. Since the target serving switch is not on the data network and isn't capable of directly interacting with IP and its related voice protocols, the call must be delivered to the target base station controller in such a way that the IP infrastructure is transparent to the receiving switch.

Figure 10:
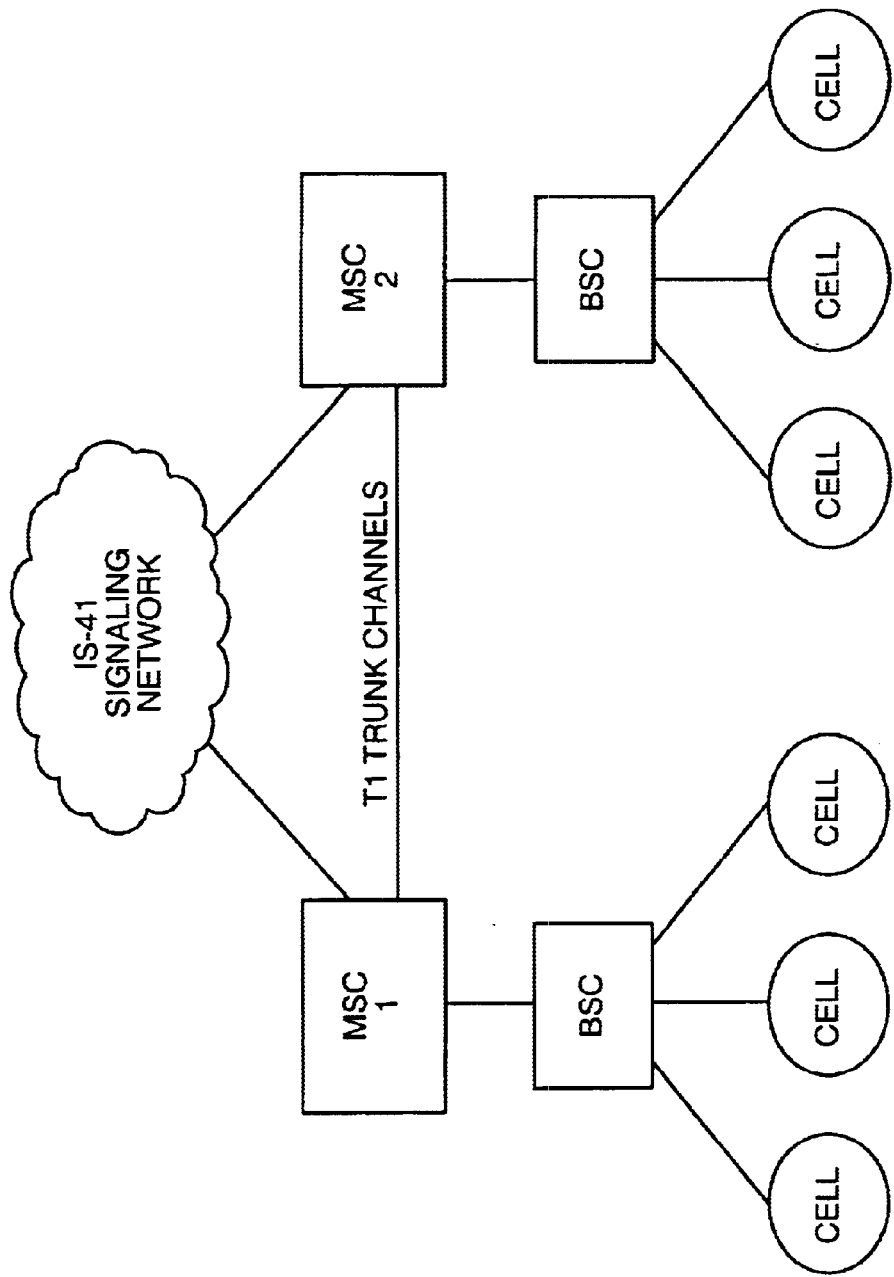
FIG. 10 illustrates the existing infrastructure for performing call handoffs in a circuit switched wireless telephony network.

FIG. 10 illustrates how inter-system handoff is performed in the existing wireless switching network. In order to perform an inter-system handoff, the two mobile switching centers involved in the call must be linked with T1 trunk channels, as well as be connected to a signaling network so that they can send and receive IS-41 messages from each other. When the original mobile switching center receives a notification from the base station controller that an inter-system handoff should be performed, it sends an IS-41 Facilities Directive (FACDIR) message to the target mobile switching center. This message includes the identifier of the trunk channel on which the speech will be sent from the original mobile switching center to the target mobile switching center. The target mobile switching center signals the base station controller to instruct it to prepare the radio channel, and then replies with a facilities directive response (facdir) IS-41 message when the preparations are complete. Upon receiving a successful response, the original mobile switching center begins utilizing the speech path to the target mobile switching center, and instructs the base station controller to have the mobile to being reception on the target base station controller.

The present invention introduces the mobile switching center gateway component which provides the gateway between the IP data network and the circuit-switched wireless telephony network needed to facilitate inter-system handoff. The mobile switching center gateway could be a separate physical entity, or more likely, its capabilities could be grouped in the same physical device as the base station controller gateway.

Figure 11:
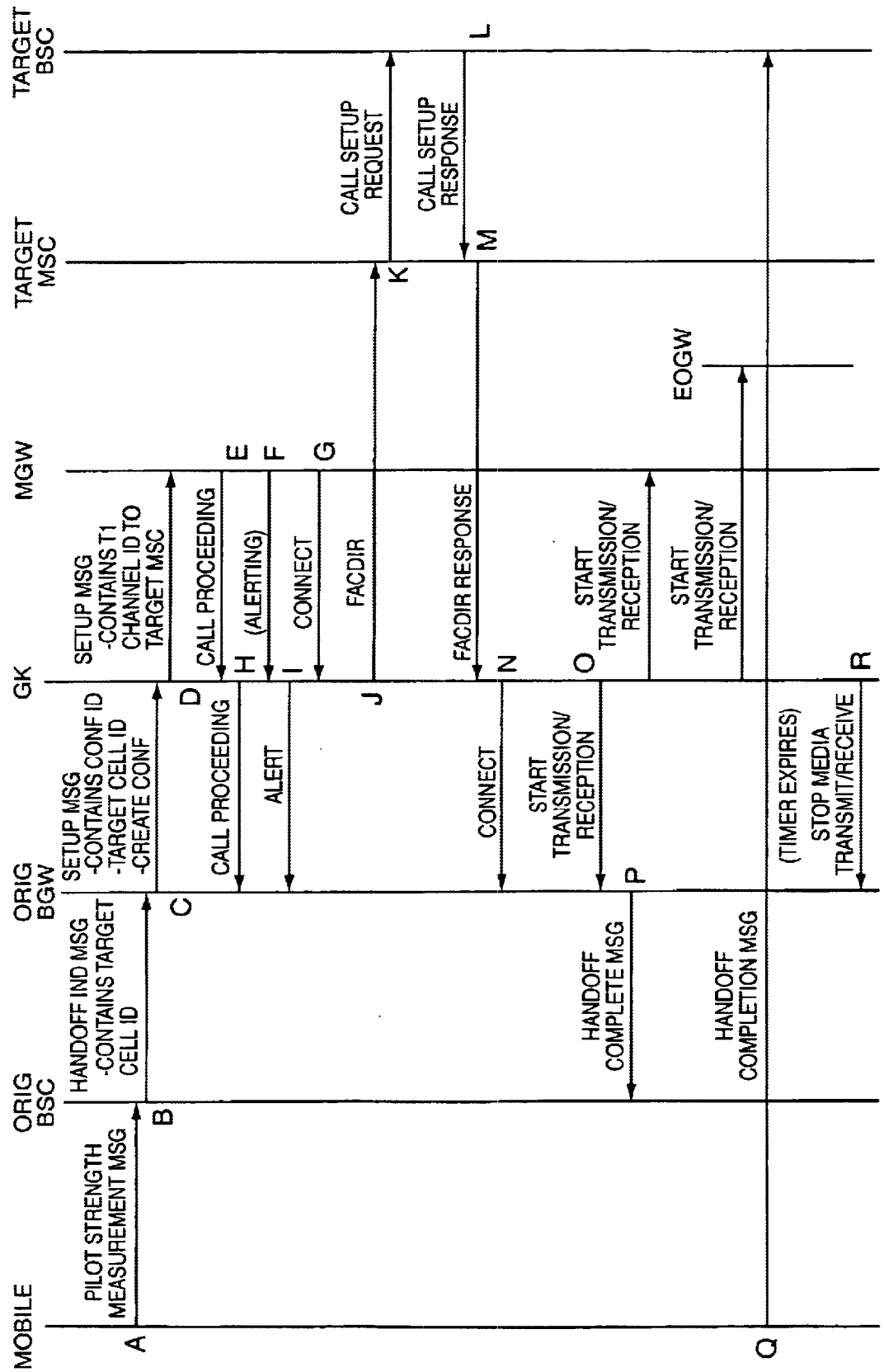
FIG. 11 illustrates the messaging sequence among the hardware nodes for inter-system handoff.

FIG. 11 illustrates the messaging which will take place in establishing an inter-system handoff. Just as with the intra-network handoff, the base station controller initiates the handoff process by sending a pilot strength measurement message A to the base station controller. The base station controller responds by sending an inter-system handoff indication message B to the base station controller gateway. This message contains a unique identifier for the target cell. The base station controller gateway then instructs the mobility gatekeeper to begin the handoff by sending a conferencing setup message C to the mobility gatekeeper which includes a new call reference value, a conference identifier, a create_conference directive, and the target cell identifier for the handoff.

The mobility gatekeeper examines the target cell identifier and determines that this is an inter-system handoff as opposed to an intra-network handoff. The mobility gatekeeper responds by relaying the setup message D to the target mobile switching center gateway. The mobile switching center gateway allocates the trunking circuit which will be used to connect to the target mobile switching center, and responds with optional call proceeding E and alerting F messages. This is followed by a connect G message to the mobility gatekeeper to complete the establishment of the call lag. Either the call proceeding, alerting, or connect message will include the identifier of the channel used to connect the mobile switching center gateway to the target mobile switching center. The call proceeding H and alerting I messages may optionally be tandemed to the original base station controller gateway.

Upon receiving the connect message from the mobile switching center gateway, the mobility gatekeeper constructs an IS-41 Facilities Directive (FACDIR) message J and sends it to the target mobile switching center. This message will contain the circuit identifier of the trunk channel which will connect the target mobile switching center with the mobile switching center gateway, as well as the target cell identifier which is used to instruct the target base station controller to establish a radio call control link with the mobile. The trunk circuit identifier is the same one which was received in the response message from the mobile switching center gateway. The target mobile switching center sends a call setup request message K to its base station controller which instructs it to begin transmitting to the mobile. As soon as the call setup is complete, the base station controller sends a call setup response message L to the target mobile switching center, which in turn responds with a facilities directive response message (facdir) M to the mobility gatekeeper.

Unlike the intra-network handoff, which can have a period of conferencing between the three entities which can last an indefinite period of time, the inter-system handoff must proceed once it has been initiated. The mobility gatekeeper begins by sending a connect call control message N to the original base station controller gateway in response to its setup message. The mobility gatekeeper then initiates the call control signaling needed to form a conference between itself, the original base station controller gateway, and the mobile switching center gateway. A conference is formed for a short and defined period of time (likely less than 10 seconds) in order to insure that speech packets are not lost while the mobile is instructed to tune to and begin receiving speech from the target cell. The gatekeeper instructs each of the endpoints to begin transmitting and receiving on the media channel O which links it to the gatekeeper. The protocol used to establish the media channels in the conference can be H.245 or a comparable protocol. Upon completing this, a conference is in place, with all speech being transmitted simultaneously through the conferencing ports of the mobility gatekeeper between the end office gateway, the original base station controller gateway, and the mobile switching center gateway.

Upon being placed in the conference, the base station controller gateway sends an extended handoff complete message P to the base station controller using IS-634 or a comparable protocol. When this message is received, the base station controller instructs the radio (using the applicable air interface protocol) that it should begin receiving and transmitting with the target cell. The radio responds by sending a handoff_completion message Q to the target base station controller. However, unlike the intra-network example, the target base station controller will not communicate this information to the mobile switching center gateway.

After the mobility gatekeeper has completed the conferencing stage of an inter-system handoff, it will set a timer which is engineered to allow enough time for the radio to tune to and begin transmitting speech in the new cell. When this timer expires, the mobility gatekeeper will release the signaling resources to the original base station controller gateway by instructing it to stop transmitting and receiving on its media channel R. At this point, the call can continue to utilize the conferencing resources in the gatekeeper, or the gatekeeper can instruct the two remaining endpoints to map their media channels to each other and release the conferencing resources in the gatekeeper.

After an inter-system handoff has occurred, any subsequent handoffs which must be performed on the mobile will occur within the circuit switched wireless telephony network, and will be handled using existing procedures. The media channels between the mobility gatekeeper, end office gateway and the mobile switching center gateway will not be impacted by this in any way.

Just as with an intra-network handoff, simulcasting can be utilized if the end office gateway endpoint is capable of simulcasting speech packets to two endpoints at once. In this case, it is not necessary to establish a conference between the three parties. Instead, the mobility gatekeeper messages the mobile switching center gateway to prepare it for the handoff, constructs and sends the IS-41 FACDIR message to the target mobile switching center to inform it of the impending handoff, and then messages the end office gateway instructing it to establish a media channel with the mobile switching center gateway and simulcast all speech to both the original base station controller gateway media channel and the mobile switching center gateway media channel. This can be accomplished using extensions to H.245 or a comparable protocol. The mobility gatekeeper can maintain a timer which will allow enough time for the mobile to tune and begin transmitting to the target base station controller. When this timer expires, the mobility gatekeeper will instruct the end office gateway to cease transmitting and receiving on the media channel to the original base station controller gateway, and begin receiving on the media channel from the mobile switching center gateway. This is a preferred implementation since it simplifies messaging and eliminates the need for conferencing resources in the gatekeeper to perform the handoff.

The release of a call forwarding an inter-system handoff is very similar to the release of a normal call shown in FIGS. 7 and 8. If the network end of the call releases following an inter-system handoff, the call proceeds as shown in FIG. 7, except that the mobility gatekeeper will relay the call control messaging to the mobile switching center gateway. The mobile switching center gateway releases the trunk circuit used in the handoff, and de-allocates all software resources used in the call.

If the mobile end of the call releases following an intra-system handoff, the mobile switching center gateway will detect this by seeing the trunk circuit disconnect between it and the target mobile switching center. When this occurs, it proceeds by sending an end session message to the end office gateway, followed by the disconnect sequence described above.

The preceding message sequences can be further explained in the following examples of system use.

First, consider a local mobile subscriber on a public, private, or residential network. A subscriber is activated in his home area served by his home base station controller. The base station controller gateway sends a registration request to the mobility gatekeeper, which in turn sends a registration notification message to the home location register in order to obtain the subscriber's service profile. The registration notification message, among other things, indicates which network that the subscriber wishes to use, public, private, or residential. The home location register retrieves the subscriber's profile and returns the IP address of the end office telephony switch which serves the subscriber, along with the subscriber's service profile for inclusion in a visitor location register. Call originations from the active mobile route from the home base station controller gateway to the home mobility gatekeeper, then proceed as an origination on the serving end office telephony switch. Optionally, the base station controller gateway maintains a default IP address for calls to the public network. Call originations from the active mobile route from the area B base station controller gateway to the area A mobility gatekeeper, then proceed as an origination on the area A end office telephony switch. The area A end office telephony switch then processes the call without knowledge that the subscriber is actually located in area B.

Next, consider a roaming mobile subscriber on a public network. A subscriber from area A is activated in a different serving area, such as from an area B base station controller. The serving area B base station controller gateway sends a registration notification message to the home location register in order to obtain the mobile subscriber's service profile. The registration notification message, among other things, indicates which network that the subscriber wishes to use, public in this example. The home location register retrieves the subscriber's profile, maps his location to the area B serving mobility gatekeeper and switch for the public network, and signals the area B end office telephony switch to create a call profile.

Finally, consider a roaming mobile subscriber on a private network. A subscriber from area A is activated in a different serving area, such as from an area B base station controller. The serving area B base station controller gateway sends a registration notification message to the home location register in order to obtain the mobile subscriber's service profile. The registration notification message, among other things, indicative which network that the subscriber wishes to use, private in this example. The home location register retrieves the subscriber's service profile and signals the home switch from area A to create a call profile. The home location register returns the subscriber's service profile to the area B serving base station controller gateway for inclusion in a visitor location register. This response also includes the IP address of the area A end office telephony switch which handles call originations. Call originations from the active mobile route from the area B base station controller gateway to the area A mobility gatekeeper, then proceed as an origination on the area A end office telephony switch. The area A end office telephony switch then processes the call without knowledge that the subscriber is actually located in area B.

In the examples, it is possible that the enhanced base station controller/base station controller gateway and the end office gateway which are used by the subscriber reside on separate inter-connected data networks. If this is the case, the call control signaling will be tandemed between the gatekeepers on the two inter-connected data networks.

Appropriate computer program code in combination with hardware implements many of the elements of the present invention. This computer code is often stored on storage media. This media can be a diskette, hard disk, CD-ROM, or tape. The media can also be a memory storage device or collection of memory storage devices such as read-only memory (ROM) or random access memory (RAM). Additionally, the computer program code can be transferred to the appropriate hardware over some type of data network.

It is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of providing end office wireline telephony services to wireless telephony subscribers using a packet data network, the method comprising:

mapping a subscriber's wireless telephony protocol to a packet data network protocol;

managing a subscriber's wireless mobility services for a wireless call, the managing comprising sending call origination messages to a first control node on the packet data network; and mapping packet data network protocol information pertaining to the wireless call to an end office access protocol, such that the wireless call can utilize all of the end office wireline telephony services associated with an end office telephony switching network, wherein managing the subscriber's wireless mobility services includes call delivery managing, the call delivery managing comprising:

mapping termination messages from the end office access protocol used by an end office telephony switch to a call control protocol used by the packet data network;

sending the termination messages to a second control node on the packet data network;

determining a serving wireless base station controller;

sending a routing request message to a serving switch if the serving wireless base station controller is not on the packet data network;

providing a directory number to be used to deliver the wireless call to the serving switch through a public switching telephone network (PSTN);

formulating, in a third call control node of the packet data network, a re-directing call control message to a gateway associated with the end office telephony switch the initiated termination;

formulating, in the gateway associated with the end office telephony switch that initiated termination, a second re-directing call control message using the end office access protocol; and re-directing the wireless call through the public switching telephone network (PSTN) using the directory number supplied by the gateway.

2. The method of claim 1 wherein managing the subscriber's wireless mobility services includes call origination managing, the call origination managing comprising:

mapping a wireless base station controller protocol to the call control protocol utilized by the packet data network;

sending the call origination messages to the gateway providing access to the end office telephony switch;

mapping the call control protocol of the packet base network to the end office access protocol;

originating the wireless call using the end office access protocol; and routing the wireless call from the end office telephony switch to its destination.

3. The method of claim 2 further comprising:

establishing a virtual speech path on the packet data network between the wireless telephony subscriber and the end office telephony switch; and transmitting packetized speech data in both directions on the packet data network between the wireless telephony subscriber and the end office telephony switch.

4. The method of claim 3 further comprising de-allocating the virtual speech path on the packet data network between the wireless telephony subscriber and the end office telephony switch.

5. The method of claim 1 wherein managing the subscriber's wireless mobility services includes call termination managing, the call termination managing comprising:

sending the termination messages to the serving wireless base station controller;

mapping the call control protocol used by the packet data network to a wireless control protocol of the serving wireless base station controller; and routing the wireless call from the wireless base station controller to its destination.

6. The method of claim 5 further comprising:

establishing a virtual speech path on the packet data network between the wireless telephony subscriber and the end office telephony switch; and transmitting packetized speech data in both directions on the packet data network between the wireless telephony subscriber and the end office telephony switch.

7. The method of claim 5 further comprising de-allocating the virtual speech path on the packet data network between the wireless telephony subscriber and the end office telephony switch.

8. The method of claim 1 wherein managing the subscriber's wireless mobility services includes intra-network handoff managing of a call from a current cell area to a target cell area, the intra-network handoff managing comprising:

(a) mapping a pilot strength measurement message into an A-interface protocol handoff indication message;

(b) mapping the A-interface protocol indication message of the base station controller to the call control protocol utilized on the packet data network;

(c) determining the location of a base station controller which serves the target cell area;

(d) establishing a connection between a control node on the packet data network and a gateway node serving the base station controller of the target cell area;

(e) establishing a virtual conference in the control node of the packet data network between an initial call and the connection established in step (d);

(f) sending a handoff initiated response message from the original base station controller gateway upon establishment of the virtual conference;

(g) receiving a handoff completion message from the mobile in the target base station controller using the A-interface protocol; and (h) terminating speech transmission to the original gateway node.

9. The method of claim 1 wherein managing the subscriber's wireless mobility services includes inter-system handoff managing of the wireless call from a current cell area having a base station controller gateway with an established media channel to a target cell area, the inter-system handoff managing comprising:

maintaining a timer that will allow sufficient time for a mobile subscriber to tune from the current cell area to the target cell area;

constructing and sending a facilities directive message to a target mobile switching center gateway;

establishing a second media channel with a target mobile switching center gateway; and simulcasting all speech to the established media channel and the second media channel until the timer expires, upon which the established media channel will cease transmitting and receiving such that only the second media channel is transmitting and receiving.

10. The method of claim 1 wherein managing the subscriber's wireless mobility services includes inter-system handoff managing of a call from a current cell area to a target cell area, the inter-system handoff managing comprising:

mapping a pilot strength measurement message into an A-interface protocol handoff indication message of a second base station controller;

mapping the A-interface protocol handoff indication message of the second base station controller to the call control protocol utilized on the packet data network;

determining a location of a third base station controller which serves the target cell area;

establishing a connection between a fourth control node on the packet data network and a gateway node that supports trunking capabilities to a target end office wireless switch serving the target cell area;

sending a facilities directive message from the fourth control node on the packet data network to the target end office wireless switch informing the target end office wireless switch of a handoff;

establishing the wireless call from the target end office wireless switch to the current cell area;

sending a connect message to the gateway node serving the second base station controller that initiated the handoff;

sending a handoff complete message to the mobile subscriber's base station controller using the A-interface protocol;

establishing a virtual conference in the control node of the packet data network between the initial call and the connection established by the sending a facilities directive message from the control node on the packet data network to the target end office wireless switch informing the target end office switch of the handoff;

commencing a timer in the control node of the packet data network for a duration that will ensure the mobile subscriber is tuned to the target cell area for RF transmission; and terminating speech transmission to the gateway node upon expiration of the timer in the control node of the packet data network.

11. The method of claim 1 wherein managing the subscriber's wireless mobility services includes intra-network handoff managing of a call from a current cell area having a base station controller gateway with an established media channel to a target cell area having a base station controller gateway, the intra-network handoff managing comprising:

establishing a media channel with the target base station controller gateway; and simulcasting all speech to the current base station controller gateway media channel and the target base station controller gateway media channel;

signaling that the intra-network handoff is complete; and ceasing transmitting and receiving on the current base station controller gateway media channel such that only the target base station controller gateway media channel is transmitting end receiving.

12. A method of providing wireline telephony services to packet data network protocol telephony subscribers, the method comprising:

managing the subscriber's wireless mobility services for a packet data network call, the managing comprising:

sending a termination message to a control node on the packet data network; and determining a service wireless base station controller; and mapping the packet data network protocol information pertaining to the packet data network call to an end office access protocol, such that the packet data network call can utilize all of the wireline services associated with an end office switching network wherein managing the mobility services includes call delivery managing, the call delivery managing comprising:

mapping termination messages from the access control protocol used by an end office telephony switch to a call control protocol used by the packet data network;

sending the termination messages to a control node on the data network;

determining a service wireless base station controller;

sending a routing request message to a serving switch if the serving base station controller is not on the packet data network;

providing a directory number to be used to deliver the call to the serving switch through the public switching telephone network (PSTN);

formulating, in the call control node of the packet data network, a re-directing call control message to the gateway associated with the end office telephony switch that initiated the termination;

formulating, in the gateway associated with the end office telephony switch that initiated the termination, a re-directing call control message using the access control protocol; and re-directing the call through the public switching telephone network (PSTN) using the directory number supplied by the gateway.

13. The method of claim 12 wherein managing the subscriber's wireless mobility services includes call origination managing, the call origination managing comprising:

(a) mapping a wireless base station controller protocol to the call control protocol utilized by the packet data network;

(b) sending call origination messages to a control node on the packet data network;

(c) sending the call origination messages to a gateway device providing access to an end office telephony switch;

(d) mapping the call control protocol of the packet data network to the end office access protocol;

(e) originating a call using the end office access protocol; and (f) routing the call from the end office telephony switch to its destination.

14. The method of claim 13 further comprising:

(a) establishing a virtual speech path on the packet data network between the wireless subscriber and the end office telephony switch; and (b) transmitting packetized speech data in both directions on the packet data network between the wireless subscriber and the end office telephony switch.

15. The method of claim 14 further comprising de-allocating the virtual speech path on the packet data network between the wireless subscriber and the end office telephony switch.

16. The method of claim 12 wherein managing the mobility services includes call termination managing, the call termination managing comprising:

mapping termination message from an end office access protocol to a call control protocol of the packet data network;

sending the termination messages to the serving wireless base station controller;

mapping the call control protocol of the packet data network to wireless control protocol of the base station controller; and routing the call from the wireless basic station controller to its destination.

17. The method of claim 16 further comprising:

(a) establishing a virtual speech path on the packet data network between the wireless subscriber and the end office telephony switch; and (b) transmitting packetized speech data in both directions on the packet data network between the wireless subscriber and the end office telephony switch.

18. The method of claim 17 further comprising de-allocating the virtual speech path on the packet data network between the wireless subscriber and the end office telephony switch.

19. A system for providing end office wireless telephony services to wireless telephony subscribers using a packet data network, the system comprising:
   means for mapping a subscriber's wireless telephony protocol to a packet data network protocol;
   means for managing the subscriber's wireless mobility services for a wireless call, the means for managing comprising means for sending call origination messages to a control node on the packet data network; and
   means for mapping the packet data network protocol information pertaining to the wireless call to an end office access protocol;
   such that the wireless call can utilize all of the wireline services associated with an end office telephony switching network wherein the means for managing mobility services includes means for call delivery managing, the means for call delivery managing comprising:
   means for mapping termination messages from the access control protocol used by an end office telephony switch to a call control protocol used by the packet data network;
   means for sending the termination messages to a control node on the data network;
   means for determining a serving wireless base station controller;
   means for sending a routing request message to a serving switch if the serving base station controller is not on the packet data network;
   means for providing a directory number to be used to deliver the call to the serving switch through the public switching telephone network (PSTN);
   means for formulating in the call control node of the packet data network, a re-directing call control message to the gateway associated with the end office telephony switch that initiated the termination;
   means for formulating, in the gateway associated with the end office telephony switch that initiated the termination, a re-directing call control message using the end office access control protocol; and
   means for re-directing the call through the public switching telephone network (PSTN) using the directory number supplied by the gateway.

20. The system of claim 19 wherein the means for managing mobility services includes means for call origination managing, the means for call origination managing comprising:
   means for mapping a wireless bas station controller protocol to a call control protocol utilized by the packet data network;
   means for sending the call origination messages to a gateway device providing access to an end office telephony switch;
   means for mapping the call control protocol of the packet data network to the end office access protocol;
   means for originating a call using the end office access protocol; and
   means for routing the call from the end office telephony switch to its destination.

21. The system of claim 20 further comprising:
   means for establishing a virtual speech path on the packet data network between the wireless subscriber and the end office telephony switch; and
   means for transmitting packetized speech data in both directions on the packet data network between the wireless subscriber and the end office telephony switch.

22. The system of claim 21 further comprising means for de-allocating the virtual speech path on the packet data network between the wireless subscriber and the end office telephony switch.

23. The system of claim 19 wherein the means for managing mobility services includes means for call termination managing, the means for call termination managing comprising:
   means for mapping termination messages from an end office access protocol to a call control protocol of the packet data network;
   means for determining a serving wireless base station controller;
   means for sending the termination messages to the serving wireless base station controller;
   means for mapping the call control protocol of the packet data network to wireless control protocol of the base station controller; and
   means for routing the call from the wireless base station controller to its destination.

24. The system of claim 23 further comprising:
   means for establishing a virtual speech path on the packet data network between the wireless subscriber and the end office telephony switch; and
   means for transmitting packetized speech data in both directions on the packet data network between the wireless subscriber and the end office telephony switch.

25. The system of claim 23 further comprising means for de-allocating the virtual speech path on the packet data network between the wireless subscriber and the end office telephony switch.

26. The system of claim 29 wherein the means for managing mobility services includes means for inter-system handoff managing of a call from a current cell area having a base station controller gateway with an established media channel to a target cell area, the means for inter-system handoff managing comprising the steps of:
   means for maintaining a timer that will allow sufficient time for a mobile subscriber to tune from the current cell area to the target cell area;
   means for constructing and sending a facilities directive message to a target mobile switching center gateway;
   means for establishing a media channel with the target mobile switching center gateway; and
   means for simulcasting all speech to the current base station controller gateway media channel and the target mobile switching center gateway media channel until the timer expires, upon which the current base station controller gateway channel will cease transmitting and receiving such that only the target mobile switching center gateway media channel is transmitting and receiving.

27. The system of claim 19 wherein the means for managing mobility services includes means for inter-system handoff managing of a call from a current cell area to a target cell area, the inter-system handoff managing comprising:
   means for mapping a pilot strength measurement message into an A-interface protocol handoff indication message;

means for mapping the handoff indication message from the A-interface protocol of the base station controller to a call control protocol utilized on the packet data network;

means for determining the location of a base station controller which serves the target cell area;

means for establishing a connection between a control node on the packet data network and a gateway node that supports trunking capabilities to an end office wireless switch serving the target cell area;

means for sending a facilities directive message from the control node on the packet data network to the target end office wireless switch informing the switch of the handoff;

means for establishing a call from the target end office wireless switch to the cell serving a mobile subscriber;

means for sending a connect message to the gateway serving the base station controller that initiated the inter-system handoff;

means for sending a handoff complete message to the mobile subscriber's base station controller using the A-interface protocol;

means for establishing a virtual conference in the control node of the packet data network between the initial call and the connection established between the control node and gateway node;

means for commencing a timer in the control node of the packet data network for a duration that will ensure the mobile subscriber is tuned to the target cell for RF transmissions; and means for terminating speech transmission to the original gateway node upon expiration of the timer in the control node of the packet data network.

28. The system of claim 19 wherein the means for managing mobility services includes means for intra-network handoff managing of a call from a current cell area having a base station controller gateway with an established media channel to a target cell area having a base station controller gateway, the means for intra-network handoff managing comprising the steps of:

means for establishing a media channel with the target base station controller gateway; and means for simulcasting all speech to the current base station controller gateway media channel and the target base station controller gateway media channel;

means for signaling that the intra-network handoff is complete; and means for ceasing transmitting and receiving on the current base station controller gateway media channel such that only the target base station controller gateway media channel is transmitting and receiving.

29. The system of claim 19 wherein the means for managing mobility services includes means for intra-network handoff managing of a call from a current cell area to a target cell area, the means for intra-network handoff managing comprising:

means for mapping a pilot strength measurement message into an A-interface protocol handoff indication message;

means for mapping the handoff indication message from the A-interface protocol of the base station controller to a call control protocol utilized on the packet data network;

means for determining the location of a base station controller which serves the target cell area;

means for establishing a connection between a control node on the packet data network and a gateway node serving the base station controller of the target cell area;

means for establishing a virtual conference in the control node of the packet data network between the initial call and the connection established between the control node and gateway node;

means for sending a handoff initiated response message from the original base station controller gateway upon establishment of the virtual conference;

means for receiving a handoff completion message from the mobile in the target base station controller using the A-interface protocol; and means for terminating speech transmission to the original gateway node.

30. A computer program product for providing end office wireline telephony services to wireless telephony subscribers using a packet data network, the computer program product having a medium with a computer program embodied thereon, the computer program product comprising:

computer program code for mapping a subscriber's wireless telephony protocol to a packet data network protocol;

computer program code for managing the subscriber's wireless mobility services for a wireless call, the computer program code for managing comprising computer program code for sending call origination messages to a control node on the packet data network; and computer program code for mapping the packet data network protocol information pertaining to said wireless call to an end office access protocol, such that the wireless call can utilize all of the wireline services associated with an end office telephony switching network wherein the computer program code for managing mobility services includes computer program code for call delivery managing, the computer code for call delivery managing comprising:

computer program code for mapping termination messages from the access control protocol used by an end office telephony switch to a call control protocol used by the packet data network;

computer program code for sending the termination messages to a control node on the data network;

computer program code for determining a serving wireless base station controller;

computer program code for sending a routing request message to a serving switch if the serving base station controller is not on the packet data network;

computer program code for providing a directory number to be used to deliver the call to the serving switch through the public switching telephone network (PSTN);

computer program code for formulating, in the call control node of the packet data network, a re-directing call control message to the gateway associated with the end office telephony switch that initiated the termination;

computer program code for formulating, in the gateway associated with the end office telephony switch that initiated the termination, a re-directing call control message using the access control protocol; and computer program code for re-directing the call through the public switching telephone network (PSTN) using the directory number supplied by the gateway.

31. The computer program product of claim 30 wherein the computer program code for managing mobility services includes computer program code for call origination managing, the computer program code for call origination managing comprising:

computer program code for mapping a wireless base station controller protocol to a call control protocol utilized by the packet data network;

computer program code for sending the call origination messages to a gateway device providing access to an end office telephony switch;

computer program code for mapping the call control protocol of the packet data network to the end office access protocol;

computer program code for originating a call using the end office access protocol; and computer program code for routing the call from the end office telephony switch to its destination.

32. The computer program product of claim 31 further comprising:

computer program code for establishing a virtual speech path on the packet data network between the wireless subscriber and the end office telephony switch; and computer program code for transmitting packetized speech data in both directions on the packet data network between the wireless subscriber and the end office telephony switch.

33. The computer program product of claim 32 further comprising computer program code for de-allocating the virtual speech path on the packet data network between the wireless subscriber and the end office telephony switch.

34. The computer program product of claim 30 wherein the computer program code for managing mobility services includes computer program code for call termination managing, the computer program code for call termination managing comprising:

computer program code for mapping termination messages from an end office access protocol to a call control protocol of the packet data network;

computer program code for determining a serving wireless base station controller;

computer program code for sending the call termination messages to the serving wireless base station controller;

computer program code for mapping the call control protocol of the packet data network to wireless control protocol of the base station controller; and computer program code for routing the call from the wireless base station controller to its destination.

35. The computer program product of claim 34 further comprising:

computer program code for establishing a virtual speech path on the packet data network between the wireless subscriber and the end office telephony switch; and computer program code for transmitting packetized speech data in both directions on the packet data network between the wireless subscriber and the end office telephony switch.

36. The computer program product of claim 34 further comprising computer program code for de-allocating the virtual speech path on the packet data network between the wireless subscriber and the end office telephony switch.

37. The computer program product of claim 30 wherein the computer program code for managing mobility services includes computer program code for inter-system handoff managing of a call from a current cell area having a base station controller gateway with an established media channel to a target cell area, the computer program code for inter-system handoff managing comprising the steps of:

computer program code for maintaining a timer that will allow sufficient time for a mobile subscriber to tune from the current cell area to the target cell area;

computer program code for constructing and sending a facilities directive message to a target mobile switching center gateway;

computer program code for establishing a media channel with the target mobile switching center gateway; and computer program code for simulcasting all speech to the current base station controller gateway media channel and the target mobile switching center gateway media channel until the timer expires, upon which the current base station controller gateway media channel will cease transmitting and receiving such that only the target mobile switching center gateway media channel is transmitting and receiving.

38. The computer program product of claim 30 wherein the computer program code for managing mobility services includes computer program code for inter-system handoff managing of a call from a current cell area to a target cell area, the computer program code for inter-system handoff managing comprising:

computer program code for mapping a pilot strength measurement message into an A-interface protocol handoff indication message;

computer program code for mapping the handoff indication message from the A-interface protocol of the base station controller to a call control protocol utilized on the packet data network;

computer program code for determining the location of a base station controller which serves the target cell area;

computer program code for establishing a correction between a control node on the packet data network and a gateway node that supports trunking capabilities to an end office wireless switch serving the target cell area;

computer program code for sending a facilities directive message from the control node on the packet data network to the target end office wireless switch informing the switch of the handoff;

computer program code for establishing a call from the target end office wireless switch to the cell serving a mobile subscriber;

computer program code for sending a connect message to the gateway serving the base station controller that initiated the inter-system handoff;

computer program code for sending a handoff complete message to the mobile subscriber's base station controller using the A-interface protocol;

computer program code for establishing a virtual conference in the control node of the packet data network between the initial call and the connection established between the control node and gateway node;

computer program code for commencing a timer in the control node of the packet data network for a duration that will ensure the mobile subscriber is tuned to the target cell for RF transmission; and computer program code for terminating speech transmission to the original gateway node upon expiration of the timer in the control node of the packet data network.

39. The computer program product of claim 30 wherein the computer program code for managing mobility services includes computer program code for intra-network handoff managing of a cell from a current cell area having a base station controller gateway with an established media channel to a target cell area having a base station controller gateway, the intra-network handoff managing comprising the steps of:

computer program code for establishing a media channel with the target base station controller gateway; and computer program code for simulcasting all speech to the current base station controller gateway media channel and the target base station controller gateway media channel;

computer program code for signaling that the intra-network handoff is complete; and computer program code for ceasing transmitting and receiving on the current base station controller gateway media channel such that only the target base station controller gateway media channel is transmitting and receiving.

40. The computer program product of claim 30 wherein the computer program code for managing mobility services includes computer program code for intra-network handoff managing of a call from a current cell area to a target cell area, the intra-network handoff managing comprising:

computer program code for mapping a pilot strength measurement message into an A-interface protocol handoff indication message;

computer program code for mapping the handoff indication message from the A-interface protocol of the base station controller to a call control protocol utilized on the packet data network;

computer program code for determining the location of a base station controller which serves the target cell area;

computer program code for establishing a connection between a control node on the packet data network and a gateway node serving the base station controller of the target cell area;

computer program code for establishing a virtual conference in the control node of the packet data network between the initial call and the connection established between the control node and gateway node;

computer program code for sending a handoff initiated response message from the original base station controller gateway upon establishment of the virtual conference;

computer program code for receiving a handoff completion message from the mobile in the target base station controller using the A-interface protocol; and computer program code for terminating speech transmission to the original gateway node.

* * * * *